United States Patent
Dewey et al.

(10) Patent No.: US 12,524,059 B2
(45) Date of Patent: Jan. 13, 2026

(54) TECHNIQUES FOR CONTROLLING COMPUTING PERFORMANCE FOR POWER-CONSTRAINED MULTI-PROCESSOR COMPUTING SYSTEMS

(71) Applicant: NVIDIA CORPORATION, Santa Clara, CA (US)

(72) Inventors: Thomas E. Dewey, Menlo Park, CA (US); Michael Irwin, Menlo Park, CA (US); Simon Lai, Mountain View, CA (US); Sau Yan Keith Li, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 17/961,430

(22) Filed: Oct. 6, 2022

(65) Prior Publication Data

US 2023/0213999 A1 Jul. 6, 2023

Related U.S. Application Data

(60) Provisional application No. 63/297,231, filed on Jan. 6, 2022.

(51) Int. Cl.
| | |
|---|---|
| *G06F 1/00* | (2006.01) |
| *G05B 13/02* | (2006.01) |
| *G06F 1/20* | (2006.01) |
| *G06F 1/3234* | (2019.01) |
| *G06F 1/324* | (2019.01) |
| *G06F 1/3287* | (2019.01) |

(52) U.S. Cl.
CPC ......... *G06F 1/3234* (2013.01); *G05B 13/028* (2013.01); *G06F 1/20* (2013.01); *G06F 1/206* (2013.01); *G06F 1/324* (2013.01); *G06F 1/3287* (2013.01)

(58) Field of Classification Search
CPC .......... G06F 1/3234; G06F 1/20; G06F 1/206; G06F 1/324; G06F 1/3287; G05B 13/028
See application file for complete search history.

(56) References Cited

U.S. PATENT DOCUMENTS

| | | |
|---|---|---|
| 7,359,205 B1 | 4/2008 | Sun et al. |
| 7,369,003 B2 | 5/2008 | Hagelin |
| (Continued) | | |

OTHER PUBLICATIONS

Notice of Allowance received for U.S. Appl. No. 17/961,440 dated Jun. 12, 2024, 18 pages.

(Continued)

*Primary Examiner* — Mohammed H Rehman
(74) *Attorney, Agent, or Firm* — Artegis Law Group, LLP

(57) ABSTRACT

A computer-implemented method of controlling power consumption in a multi-processor computing device comprises determining a first value for a first power setting associated with a first processor based on a sound level generated by the multi-processor computing device; determining a second value for the first power setting based on a power consumption level of the multi-processor computing device; comparing the first value to the second value; and causing the first processor to perform one or more operations based on the lesser of the first value and the second value.

21 Claims, 10 Drawing Sheets

(56) References Cited

U.S. PATENT DOCUMENTS

| | | | |
|---|---|---|---|
| 8,233,644 | B2 | 7/2012 | DeMoss |
| 8,515,095 | B2 | 8/2013 | Bard |
| 8,928,393 | B1 | 1/2015 | Cobo et al. |
| 9,360,904 | B2 | 6/2016 | Lovicott et al. |
| 10,386,899 | B2 | 8/2019 | Wang et al. |
| 10,488,901 | B1 | 11/2019 | Locke et al. |
| 10,705,581 | B2 | 7/2020 | La Monica et al. |
| 11,836,062 | B2* | 12/2023 | Ma .................. G06F 1/20 |
| 2002/0147932 | A1* | 10/2002 | Brock ............. G06F 1/3203 |
| | | | 713/300 |
| 2005/0240316 | A1 | 10/2005 | Mayer |
| 2009/0222147 | A1 | 9/2009 | Nakashima et al. |
| 2009/0235097 | A1 | 9/2009 | Hamilton et al. |
| 2009/0259347 | A1 | 10/2009 | Gross et al. |
| 2010/0169585 | A1 | 7/2010 | Steinbrecher et al. |
| 2013/0096720 | A1 | 4/2013 | Brey et al. |
| 2013/0159741 | A1 | 6/2013 | Schluessler et al. |
| 2013/0283078 | A1 | 10/2013 | Branover et al. |
| 2014/0117908 | A1 | 5/2014 | Busch et al. |
| 2014/0277815 | A1 | 9/2014 | Hanumaiah et al. |
| 2015/0106642 | A1 | 4/2015 | Naffziger et al. |
| 2015/0108934 | A1 | 4/2015 | Wong et al. |
| 2016/0266629 | A1 | 9/2016 | Merrikh et al. |
| 2017/0017281 | A1 | 1/2017 | Artman et al. |
| 2017/0074729 | A1 | 3/2017 | Coutts et al. |
| 2017/0093176 | A1* | 3/2017 | Harmke .................. H02J 9/002 |
| 2017/0102744 | A1 | 4/2017 | Haley et al. |
| 2017/0336839 | A1 | 11/2017 | Ho et al. |
| 2018/0052506 | A1 | 2/2018 | Kuo et al. |
| 2018/0260008 | A1 | 9/2018 | Ping et al. |
| 2019/0008074 | A1 | 1/2019 | Chen |
| 2019/0043737 | A1 | 2/2019 | Hutton |
| 2019/0223320 | A1 | 7/2019 | Lee et al. |
| 2019/0369693 | A1 | 12/2019 | Ismail et al. |
| 2020/0097431 | A1 | 3/2020 | Wang |
| 2020/0118012 | A1 | 4/2020 | Boaz Costa Leite et al. |
| 2020/0167113 | A1 | 5/2020 | Chen et al. |
| 2021/0021399 | A1* | 1/2021 | Liu .................. H04L 1/0003 |
| 2021/0157383 | A1 | 5/2021 | Hsu et al. |
| 2021/0173456 | A1 | 6/2021 | Kulkarni et al. |
| 2021/0239748 | A1* | 8/2021 | Kondo .............. G01R 19/16542 |
| 2021/0270936 | A1* | 9/2021 | Chen ....................... G06F 3/011 |
| 2021/0326188 | A1 | 10/2021 | Hsu et al. |
| 2021/0373625 | A1 | 12/2021 | Koo et al. |
| 2022/0075433 | A1 | 3/2022 | Matsushita |
| 2022/0075443 | A1* | 3/2022 | Crane .................. G06F 1/3206 |
| 2022/0136909 | A1 | 5/2022 | Kim et al. |
| 2022/0147125 | A1 | 5/2022 | Huai et al. |
| 2022/0164011 | A1 | 5/2022 | Sahu et al. |
| 2022/0300324 | A1 | 9/2022 | Chang et al. |
| 2023/0022881 | A1* | 1/2023 | Ma ....................... G06F 11/3062 |
| 2023/0057741 | A1 | 2/2023 | Prabhakar et al. |
| 2023/0079292 | A1 | 3/2023 | Raina et al. |
| 2023/0127216 | A1 | 4/2023 | He et al. |
| 2023/0135691 | A1 | 5/2023 | Rohrkemper et al. |
| 2023/0350471 | A1 | 11/2023 | He et al. |
| 2024/0019915 | A1 | 1/2024 | Chu et al. |
| 2024/0223290 | A1* | 7/2024 | Sanisetty .............. H04L 5/0073 |
| 2024/0231455 | A1 | 7/2024 | Sharma et al. |
| 2024/0364098 | A1* | 10/2024 | Fujii ....................... H02M 3/00 |
| 2025/0267589 | A1* | 8/2025 | Parello ................ H04W 52/243 |

OTHER PUBLICATIONS

Non Final Office Action received for U.S. Appl. No. 17/961,435 dated Mar. 27, 2024, 21 pages.

Non Final Office Action received for U.S. Appl. No. 17/961,440 dated Feb. 12, 2024, 16 pages.

Final Office Action received for U.S. Appl. No. 17/961,435 dated Aug. 15, 2024, 20 pages.

Final Office Action received for U.S. Appl. No. 17/961,435 dated Jul. 9, 2025, 20 pages.

Non Final Office Action received for U.S. Appl. No. 17/961,435 dated Jan. 16, 2025, 25 pages.

Notice of Allowance received for U.S. Appl. No. 17/961,435 dated Oct. 21, 2025, 13 pages.

\* cited by examiner

GPU Fan Speed

|  | 1 | 2 | 3 | 4 | 5 | 6 | 7 |
|---|---|---|---|---|---|---|---|
| 1 | SL1 | SL2 | SL3 | SL4 | SL5 | SL6 | *SL6* |
| 2 | SL2 | SL2 | SL3 | SL4 | SL5 | SL6 | *SL6* |
| 3 | SL3 | SL3 | SL3 | SL4 | SL5 | SL6 | SL7 |
| 4 | SL4 | SL4 | SL4 | SL4 | SL5 | SL6 | SL7 |
| 5 | SL5 | SL5 | SL5 | SL5 | SL5 | SL6 | SL7 |
| 6 | SL6 | SL6 | SL6 | SL6 | SL6 | *SL6* | SL7 |
| 7 | *SL6* | *SL6* | SL7 | SL7 | SL7 | SL7 | SL7 |

(CPU Fan Speed on vertical axis)

TECHNIQUES FOR CONTROLLING COMPUTING PERFORMANCE FOR POWER-CONSTRAINED MULTI-PROCESSOR COMPUTING SYSTEMS

CROSS-REFERENCE TO RELATED APPLICATIONS

This application claims priority benefit of the United States Provisional Patent Application titled, "TECHNIQUES FOR CONTROLLING COMPUTING AND ACOUSTIC PERFORMANCE FOR POWER-CONSTRAINED MULTI-PROCESSOR COMPUTING SYSTEMS" filed on Jan. 6, 2022 and having Ser. No. 63/297,231. The subject matter of this related application is hereby incorporated herein by reference.

BACKGROUND

Field of the Various Embodiments

Embodiments of the present disclosure relate generally to computer architecture and design and, more specifically, to techniques for controlling computing performance for power-constrained multi-processor computing systems.

Description of the Related Art

For typical laptop computers, heat dissipation and power delivery to the processor are the overriding constraints that limit processing performance. In particular, when powered using an unlimited power source, such as a power adapter connected to an alternating current (AC) source, the dominant performance constraint for a laptop is the amount of heat generated by the central processing unit (CPU) and other integrated circuits that can be dissipated using a fan cooling system without generating a level of fan noise that is objectionable to the user and/or a laptop skin temperature reaching an uncomfortable level. That is, the processing speed of the CPU is usually constrained not by CPU design, but by laptop noise generation. By contrast, when powered using a battery, the dominant performance constraint for a laptop is the rate at which power can be supplied to the CPU without increasing battery drain rate above a level that is acceptable to the user. Because processor power consumption is proportional to processor speed, to achieve a target battery drain rate, the processing speed of a laptop CPU is limited by the rate at which power can be supplied to the CPU and still meet the target battery drain rate.

To maximize processing performance of a laptop while complying with both fan noise and target battery drain rate, a processor power limit is enforced during operation of the laptop. More specifically, the maximum amount of power consumed by the CPU during operation is controlled, by modulating the CPU core frequency or the CPU core frequency and voltage, and forced to remain below the processor power limit. Accordingly, when a laptop is powered via an AC power adapter, the CPU core frequency can be modulated to prevent fan noise from exceeding a specified acoustic level, and, when a laptop is running on battery power, the CPU core frequency can be modulated to ensure a specified battery drain rate is met. Consequently, in single-processor laptops, CPU performance can be efficiently traded off for extended runtime (based on a lower battery drain rate) or improved acoustic performance.

In multi-processor laptops, however, such as laptops that include a discrete graphics processing unit (GPU) in addition to a CPU, maximizing processing performance while complying with acoustic and battery drain rate limits can be far more difficult. Typically, in discrete GPU laptops, total processor power is allocated between the GPU and the CPU, and the power allocation can vary as ambient conditions and computing workload change. Further, one processor power limit is usually enforced for the CPU that defines the maximum power that is to be allocated to the CPU during operation, and another processor power limit is usually enforced for the GPU that defines the maximum power that is to be allocated to the GPU. Ideally, these processor power limits are selected such that, during operation, the joint workload performed by the CPU and the GPU (referred to as the total processor performance) is maximized. That is, ideally, processor power is allocated between the CPU and the GPU such that the CPU provisions computational tasks to the GPU at a rate that matches the rate at which the GPU can perform those computational tasks. With this type of approach, the total amount of processor power available in the laptop can be utilized most effectively.

In practice, however, the processor power limits for a CPU and a GPU within a given laptop are selected based on a "best guess" regarding how total processor power should be allocated between the CPU and the GPU for a given operating scenario and joint workload. As a result, for a given joint workload, one of the processors may be allocated more power, and the other processor allocated less power, than what is needed to maximize overall laptop performance. For example, the CPU could be allocated more power than what is needed to generate computational tasks for the GPU at a rate at which the GPU can performance those tasks. In this of scenario, the excess processor power allocated to the CPU could go unused or could be consumed without increasing total processor performance, thereby reducing overall laptop efficiency.

As the foregoing illustrates, what is needed are more effective techniques for allocating power for joint workloads in multi-processor computing devices.

SUMMARY

Various embodiments set forth techniques for efficiently controlling computing and acoustic performance in multi-processor computing devices. In the various embodiments, a computer-implemented method of controlling power consumption in a multi-processor computing device comprises: determining a first value for a first power setting associated with a first processor based on a sound level generated by the multi-processor computing device; determining a second value for the first power setting based on a power consumption level of the multi-processor computing device; comparing the first value to the second value; and causing the first processor to perform one or more operations based on the lesser of the first value and the second value.

At least one technical advantage of the disclosed techniques relative to the prior art is that, with the disclosed techniques, trade-offs between compute performance and acoustics or battery drain rate can be efficiently managed in multi-processor computing devices. More specifically, with the disclosed techniques, processor power that is initially allocated to one processor in a multi-processor computing device and is unused or inefficiently used can be automatically reallocated to another processor in the computing device. Accordingly, with the disclosed techniques, total available processor power can be utilized more efficiently, thereby increasing the overall performance of the computing device, relative to what can be achieved using prior art approaches. A further advantage is that the total available processor power can be allocated efficiently across the different processors in a given computing device even as total available processor power changes dynamically during operation due to varying ambient conditions, compute loads, and/or user preferences. These technical advantages represent one or more technological improvements over prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 illustrates a sound level table for the laptop computer of FIG. 2, according to various embodiments;

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

INTRODUCTION

As noted previously, heat dissipation and power delivery are the primary constraints that limit the compute performance of discrete-GPU laptop computers. Such laptop computers include two processor devices (a CPU and a GPU) that can each contribute to compute performance and consume a significant fraction of the total available processor power. Power control systems for such laptops generally attempt to maximize compute performance by adjusting the allocation of available processor power between the CPU and GPU as compute workload and operating conditions of a laptop change. Thus, for a particular set of compute workload and operating conditions, a power control system may assign one static power limit for the CPU and another for the GPU, and modulate the processor frequency of each so that these power limits are not exceeded. In practice, however, such power limits are chosen arbitrarily, or are based on a "best guess" as to how available processor power should be allocated between the CPU and the GPU for a given situation. Consequently, compute performance of the laptop can be adversely affected, as described below in conjunction with FIGS. 1A and 1B.

Figure 1A:
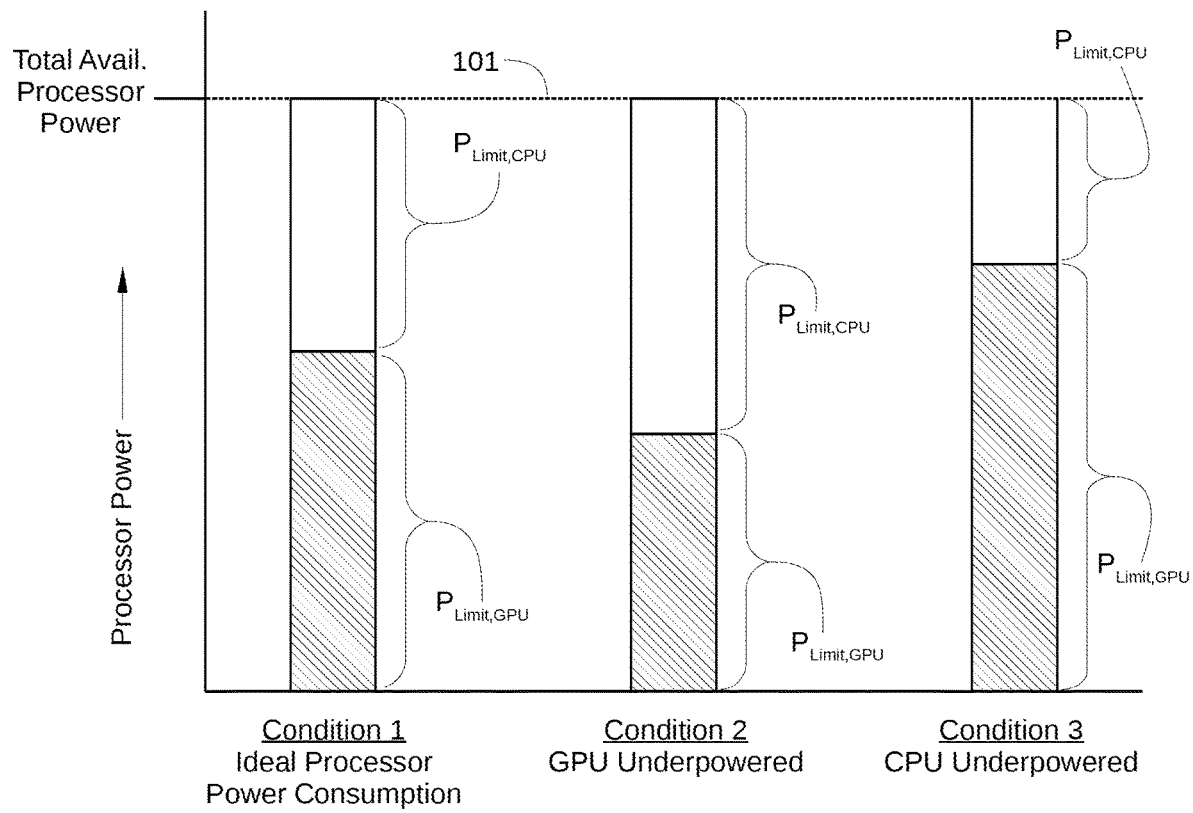
FIG. 1A is a schematic illustration of how processor power is consumed in a multi-processor computing device under differing conditions, according to various embodiments.
Figure 1B:
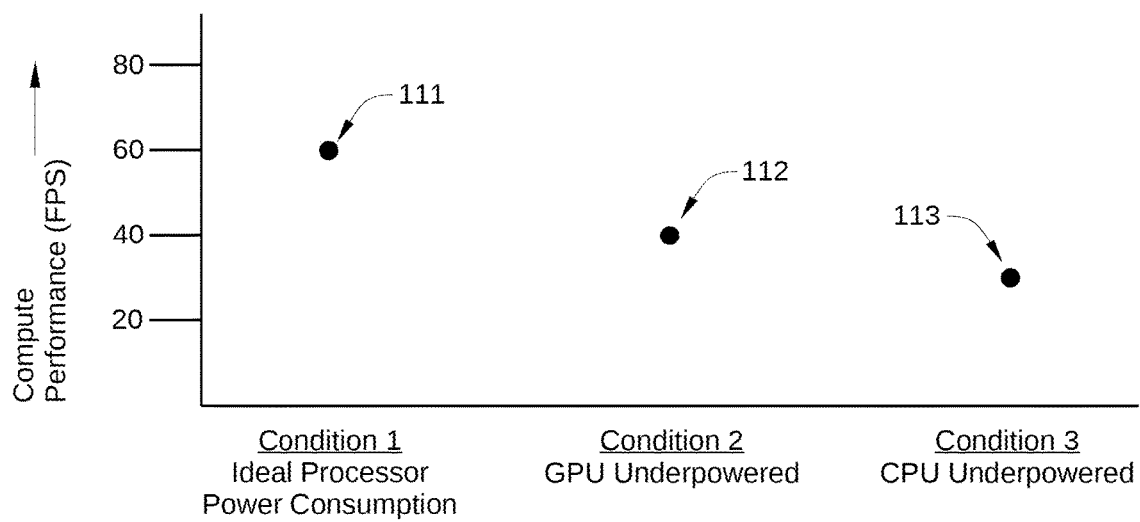
FIG. 1B is a schematic illustration of the compute performance of a multi-processor computing device under the differing conditions, according to various embodiments.

FIG. 1A is a schematic illustration of how processor power is consumed in a multi-processor computing device using differing power allocations between a CPU and a GPU, and FIG. 1B is a schematic illustration of the compute performance of the multi-processor computing device when using the differing power allocations. As shown, at each of Power Allocations 1, 2, and 3, total available processor power 101 is allocated differently between a CPU and a GPU of the multi-processor computing device, such as a discrete-GPU laptop computer. In each case, total available processor power 101 is divided into a first portion that can be utilized by the CPU (indicated by $P_{Limit,CPU}$) and a second portion that can be utilized by the GPU (indicated by $P_{Limit,GPU}$). In FIG. 1A, power utilized by the GPU is indicated by crosshatching.

Generally, total available processor power 101 represents the total power available for use by the processors of the multi-processor computing device. As such, total available processor power 101 corresponds to the total power available to the multi-processor computing device minus the power consumed by the remaining electrical components of the multi-processor computing device. For example, when the multi-processor computing device is a laptop computer, such remaining electrical components may include the display, cooling fans, Wi-Fi transceiver, track pad, peripheral components connected to the laptop, and the like. When such a laptop is powered by the laptop battery, total available processor power 101 is typically determined based on processor power associated with a specified battery drain rate. Thus, in such instances, total available processor power 101 is a maximum allowable power utilization by the CPU and GPU that enables the specified battery drain rate for the laptop. Alternatively, when the laptop is powered by an alternating current (AC) adapter, and therefore is not limited by battery-related power constraints, total available processor power 101 may be determined based on a processor power associated with a specified fan noise level. Thus, in such instances, total available processor power 101 is a maximum allowable power utilization by the CPU and GPU associated with a fan noise level that is less than or equal to the specified fan level.

In practice, total available processor power 101 and the allocation of power between the CPU and the GPU are typically adjusted as computing workload and ambient conditions change, such as an increase or decrease in external air temperature, the introduction or removal of a blockage of cooling fans, an increase or decrease in the quantity of frame-based computational tasks to be performed by the GPU, and the like. For purposes of explanation, total available processor power 101 and the allocation thereof between the CPU and GPU are for the same computing workload and ambient conditions for each of Power Allocations 1, 2, and 3.

At Power Allocation 1, ideal values for $P_{Limit,CPU}$ and for $P_{Limit,GPU}$ have been selected. Therefore, for the joint workload currently being performed by the laptop, $P_{Limit,CPU}$ is well-matched to the workload for the CPU, and $P_{Limit,GPU}$ is well-matched to the workload for the GPU. Thus, the CPU receives sufficient power to generate computational tasks to the GPU at substantially the same rate that the GPU can perform the computational tasks. As a result, at Power Allocation 1, the laptop computer operates with an ideal compute performance 111 of 60 frames per second (fps) video generation, in which all or substantially all of total available processor power 101 is efficiently utilized for performing the joint workload.

At Power Allocation 2, a more realistic scenario is depicted. In contrast to Power Allocation 1, at Power Allocation 2, the value for $P_{Limit,GPU}$ is not well-matched to the current compute workload of the GPU, and the value for $P_{Limit,CPU}$ is not well-matched to the current compute workload of the CPU. Instead, the value for $P_{Limit,GPU}$ IS too low for the current compute workload of the GPU, and the value for $P_{Limit,CPU}$ is too high for the current compute workload of the CPU. For example, the GPU may be operating at an insufficiently high frequency (and therefore power utilization rate) to complete as much rendering or other computational work that the CPU is capable of generating when the CPU utilizes power at the rate indicated by $P_{Limit,CPU}$. Thus, at Power Allocation 2, the GPU is underpowered when power is supplied thereto at $P_{Limit,GPU}$, and the CPU is overpowered when power is supplied thereto at the rate indicated by $P_{Limit,CPU}$. As a result, using Power Allocation 2, the laptop computer operates with a reduced compute performance 112 of 40 fps video generation, even though the CPU and GPU may utilize all of total available processor power 101 during operation.

At Power Allocation 3, another realistic scenario is depicted. Similar to Power Allocation 2, at Power Allocation 3, the value for $P_{Limit,GPU}$ is not well-matched to the current compute workload of the GPU and the value for $P_{Limit,CPU}$ is not well-matched to the current compute workload of the CPU. At Power Allocation 3, the value for $P_{Limit,GPU}$ is too high for the current compute workload of the GPU, and the value for $P_{Limit,CPU}$ is too low for the current compute workload of the CPU. For example, the GPU may be operating at a higher frequency (and therefore higher power utilization rate) than necessary to complete the rendering or other computational work that is provided by the CPU when the CPU utilizes power at the rate indicated by $P_{Limit,CPU}$. Thus, at Power Allocation 3, the GPU is starved of computational work and does not efficiently utilize available power at the rate indicated by $P_{Limit,GPU}$, while the CPU cannot generate sufficient computational work for the GPU. Because the laptop cannot efficiently utilize total available processor power 101 during operation, at Power Allocation 3, the laptop computer operates with a reduced compute performance 113 of 30 fps video generation, even though the CPU and GPU may utilize all of total available processor power 101 during operation.

As depicted in Power Allocation 2 and 3, the allocation of total available processor power 101 between the CPU and GPU in conventional computing devices is usually not ideal, which reduces overall compute performance of such computing devices. According to various embodiments, a power control architecture for a multi-processor computing device includes two independent power controllers: a joint processor acoustic controller and a joint processor power controller. These two power controllers operate concurrently and independently to reduce the power consumed by the CPU and GPU to a minimum necessary level that sustains a joint processor performance target for the multi-processor computing device. The joint processor performance target is dynamically adjusted so that the CPU and GPU operate in compliance with a target sound level (i.e., a fan noise level) for the multi-processor computing device and a target power or current level for the multi-processor computing device. Specifically, the joint processor acoustic controller determines power setting values for the GPU that enable the multi-processor computing device to operate with the highest performance while complying with the target sound level, and the joint processor power controller determines power setting values for the GPU that enable the multi-processor computing device to operate with the highest performance while complying with the target power or current level. The GPU is then operated using the most restrictive power setting values. As a result, CPU and GPU power, and therefore joint processor performance, is determined by whichever objective for the multi-processor computing device is most restrictive: the target sound level or the target power (or current) level.

Further, in some embodiments, power setting values for the CPU are determined based on an error rate between a rate of provisioning of computational tasks by the CPU and a rate of completion of the computational tasks by the GPU. Thus, when the CPU generates computational tasks faster than the computational tasks can be consumed by the GPU, one or more power setting values for the CPU are reduced, and more of total available processor power 101 can be allocated to the GPU. Examples of such embodiments are described below.

System Overview

Figure 2:
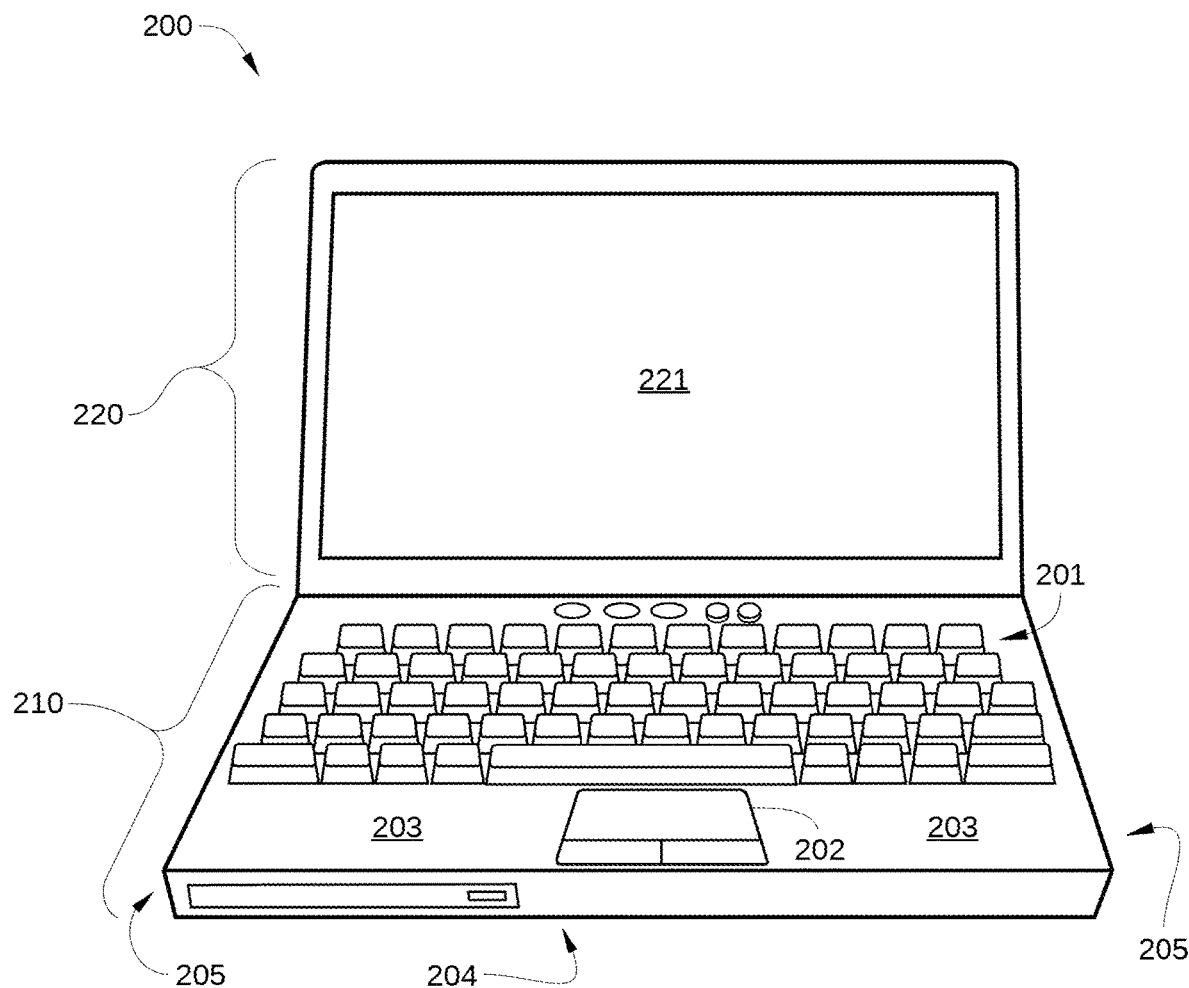
FIG. 2 illustrates a laptop computer configured to implement one or more aspects of the various embodiments.

FIG. 2 illustrates a laptop computer 200 configured to implement one or more aspects of the various embodiments. Laptop computer 200 is a portable personal computer with a hinged, or "clamshell," configuration, and generally includes the capabilities of a desktop computer and associated external devices. For example, in some embodiments, laptop computer 200 includes an integrated keyboard 201, a touchpad (or trackpad) 202, and a display screen 221. By folding display screen 221 closed onto keyboard 201, laptop computer 200 can be readily stowed and carried. Therefore, laptop computer 200 can be easily transported and is suitable for mobile use. As shown, laptop computer 200 includes a base portion 210 and a display portion 220 that is movably coupled to base portion 210. Base portion 210 includes keyboard 201, touchpad 202, and palm rests 203, and display portion 220 includes display screen 221, such as a liquid crystal display (LCD) or light-emitting diode (LED) based display screen. Laptop computer 200 may further include physical interfaces for various input and output devices alongside edges 205 of base portion 210, such as one or more universal serial bus (USB) ports, external display ports, Ethernet ports, and the like. Laptop computer 200 may further include one or more integrated webcams and/or built-in microphones (not shown).

Figure 3:
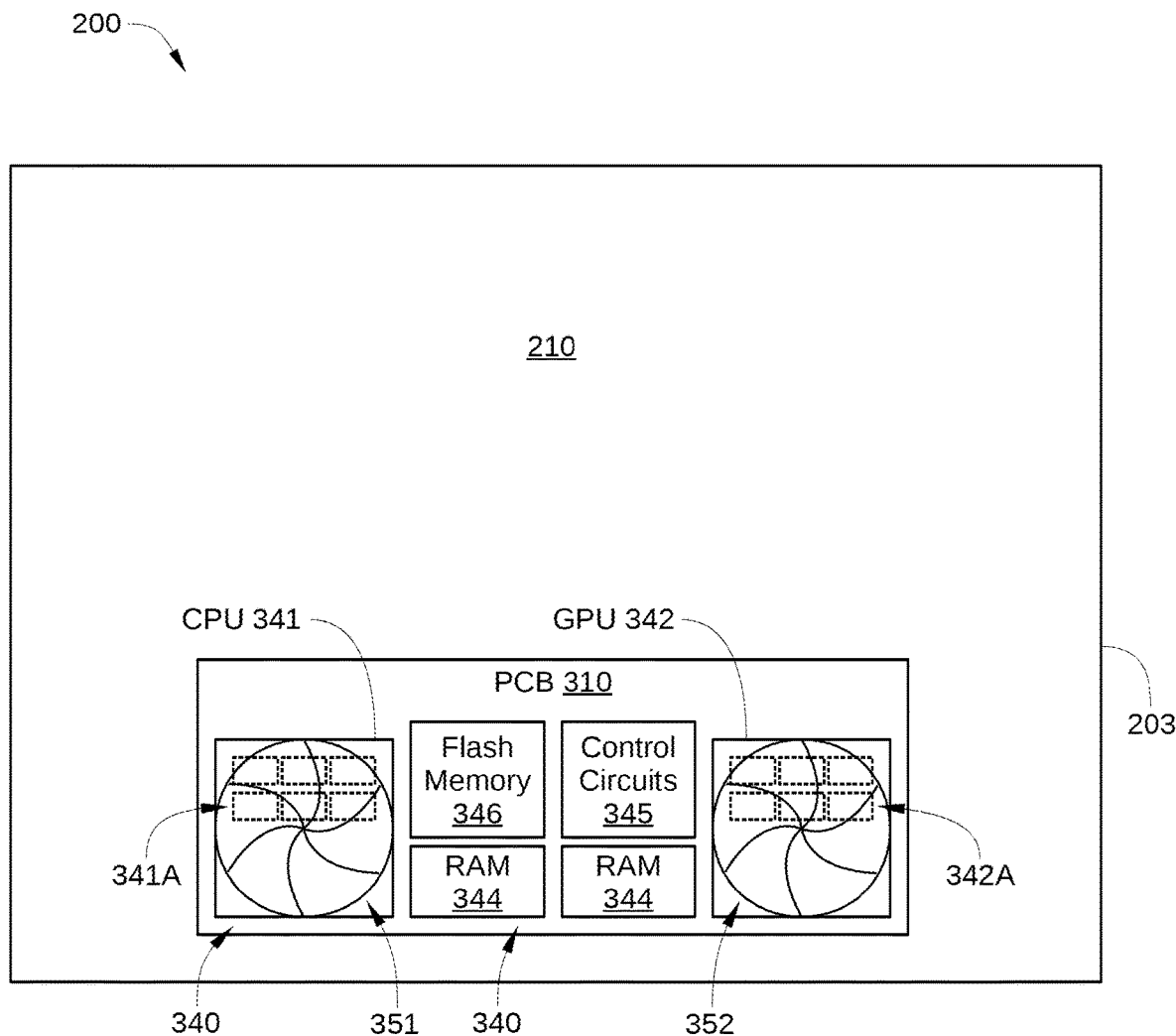
FIG. 3 is a more detailed illustration of the base portion of the laptop computer of FIG. 2, according to various embodiments.

FIG. 3 is a more detailed illustration of base portion 210, according to various embodiments. Specifically, FIG. 3 shows a schematic top view of base portion 210. For clarity, keyboard 201 and touchpad 202 are omitted in FIG. 2, so that additional components of laptop computer 200 are visible. As shown, in the embodiment illustrated in FIG. 3, laptop computer 200 further includes a printed circuit board (PCB) 310 with multiple electronic components 340 mounted thereon. Electronic components 340 include a CPU 341, a GPU 342, one or more random access memory (RAM) chips 344 or other memory chips, control circuits 345, flash memory 346, and the like. Mounted on or disposed proximate CPU 341 is a cooling fan 351, and mounted on or disposed proximate GPU 342 is a cooling fan 352. In some embodiments, base portion 210 further includes a heat sink, such as a vapor chamber (not shown). Cooling fan 351, cooling fan 352, and the heat sink are configured to transfer heat generated by electronic components 340 and PCB 310 away from PCB 310 and out of base portion 210.

CPU 341 is a processor configured to perform certain computational work, such as running an operating system and software applications, generating and providing computational tasks to GPU 342, performing physics calculations associated with such computational tasks, and the like. In some embodiments, CPU 341 includes multiple computing cores 341A (dashed lines). GPU 342 is a processor configured to perform certain computational work, such as rendering video frames, performing finite-element analysis computations, and the like. In some embodiments, GPU 342 includes multiple computing cores 342A (dashed lines). Control circuits 345 are configured to implement one or more control algorithms associated with the various embodiments. Such control algorithms can be implemented in whole or in part as software- or firmware-implemented logic, and/or as hardware-implemented logic circuits included in control circuits 345. Alternatively, one or more control algorithms associated with the various embodiments can be implemented in whole or in part as software- or firmware-implemented logic associated with CPU 341 and/or GPU 342. Embodiments of such control algorithms are described in greater detail below in conjunction with FIG. 4.

Power Control System for Multi-Processor Computing Device

Figure 4:
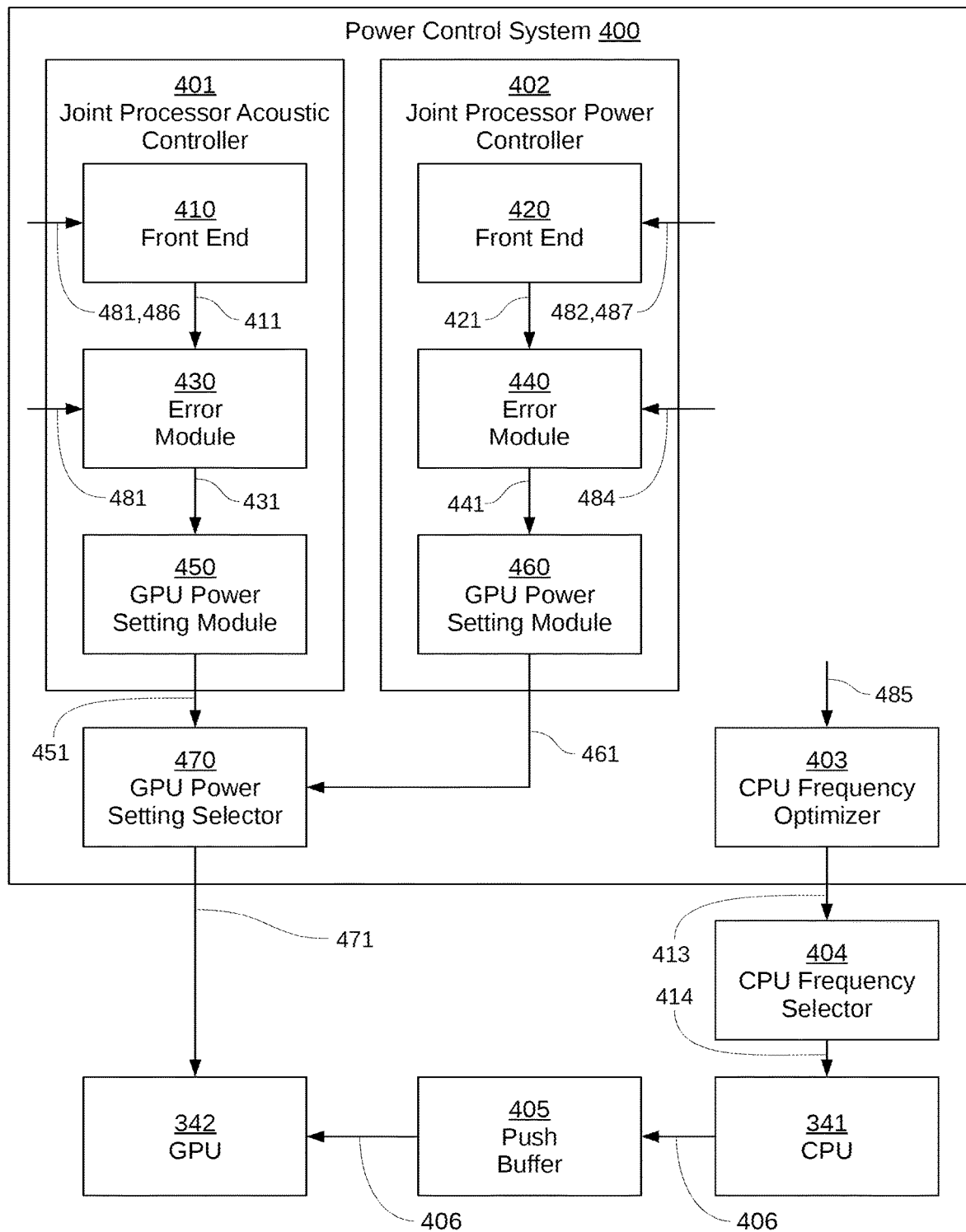
FIG. 4 is a block diagram of a power control system for the laptop computer of FIG. 2, according to various embodiments.

FIG. 4 is a block diagram of a power control system 400 for a multi-processor computing device, such as laptop computer 200 of FIGS. 2 and 3, according to various embodiments. During operation of laptop computer 200 (or any other multi-processor computing device that includes power control system 400), power control system 400 determines one or more power setting values 471 for GPU 342 and one or more power setting values 413 for CPU 341. Power setting values 471 and power setting values 413 enable processor power allocation between GPU 342 and CPU 341 to approach the ideal processor power consumption depicted by Power Allocation 1 of total available processor power 101 in FIG. 1A. Thus, most or all of total available processor power 101 is efficiently utilized by GPU 342 and CPU 341 for performing a joint workload. In some embodiments, power control system 400 determines one or more power setting values 471 at a specific evaluation rate, such as multiple times per second.

In the embodiment illustrated in FIG. 4, power control system 400 includes a joint processor acoustic controller 401, a joint processor power controller 402, and a CPU frequency optimizer 403. In some embodiments, some or all of the components of power control system 400 are implemented in control circuits 345 of FIG. 3. Also shown in FIG. 4 but not included in power control system 400 are CPU 341, GPU 342, a CPU frequency selector 404, and a push buffer 405. Various telemetry information 481, 482, and 484 that is generated by sensors included within laptop computer 200 and control values that enable certain embodiments to be implemented by power control system 400 are also included in FIG. 4.

Push buffer 405 is a buffer memory that receives and stores computational tasks 406 generated by CPU 341, so that GPU 342 can fetch and perform such computational tasks 406 with low latency. In some embodiments, push buffer 405 is implemented as an asynchronous first-in, first-out (FIFO) memory device, such as a ring buffer. In the embodiment illustrated in FIG. 4, push buffer 405 is depicted as a separate device from CPU 341 and GPU 342. In other embodiments, push buffer 405 can be disposed within CPU 341 or GPU 342.

In general, joint processor acoustic controller 401 and joint processor power controller 402 operate concurrently and independently. Joint processor acoustic controller 401 determines power setting values 451 for GPU 342 that enable laptop computer 200 to operate with the highest performance while complying with a user-selected target sound level 486. Joint processor power controller 402 determines power setting values 461 for GPU 342 that enable laptop computer 200 to operate with the highest performance while complying with a specified target processor power or target battery drain rate 487. GPU power setting selector 470 then selects the most restrictive power setting values (i.e., either power setting values 451 or power setting values 461). As a result, GPU power consumption is reduced to a minimum necessary level that still sustains a joint computing performance goal of laptop 200 (such as total processing power). Alternatively, in some embodiments, for each type of power setting, GPU power setting selector 470 selects the most restrictive power setting values from power setting values 451 and power setting values 461. Thus, in such embodiments, GPU power setting selector 470 selects the most restrictive value for a GPU frequency cap from power setting values 451 and power setting values 461 and selects the most restrictive value for a frame-rate limit from power setting values 451 and power setting values 461.

In addition, CPU frequency optimizer 403 independently sets a CPU frequency cap 413 that limits power consumption of CPU 341 without restricting a fill rate of push buffer 405. In some embodiments, CPU frequency optimizer 403 determines a CPU frequency cap 413 based on an error rate between a rate of provisioning of entries (e.g., computational tasks 406) by CPU 341 to push buffer 405 and a rate of consumption of the entries by GPU 342 from push buffer 405.

Acoustic Control in a Multi-Processor Computing Device

Joint processor acoustic controller 401 determines one or more power setting values 451 for GPU 342, such as a GPU frequency cap, a frame-rate limit, and/or an active core count. The GPU frequency cap is a frequency of operation for cores 342A included in GPU 342, the frame-rate limit is a frame-based output goal for GPU 342 indicating a target rate that at which video frames are generated by GPU 342, and the active core count is a number of cores 342A that are actively employed by GPU 342. Each of the one or more power setting values 451 affects a rate at which power is consumed by GPU 342. In particular, lowering the frequency cap for GPU 342 reduces the frequency at which power cores 342A operate; lowering the frame-rate limit reduces the rate at which video frames can be generated by GPU 342, and reducing the active core count of GPU 342 reduces the number of cores 342A that can operate and therefore consume power. Joint processor acoustic controller 401 determines power setting values 451 that enable laptop computer 200 to operate with the highest performance while complying with user-selected target sound level 486.

In some embodiments, joint processor acoustic controller 401 determines power setting values 451 based on certain telemetry information 481 associated with laptop computer 200. Telemetry information 481 can include processor information, such as GPU temperature and CPU temperature. Alternatively or additionally, in some embodiments, telemetry information 481 can include fan information, such as fan speed and/or noise level. In addition, joint processor acoustic controller 401 determines power setting values 451 based on one or more static operating settings, such as a user-selected target sound level 486 for laptop computer 200. For example, in some embodiments, user-selected sound level 486 specifies a target maximum acceptable fan-noise level for laptop computer 200. In some embodiments, user-selected sound level 486 is a specific qualitative noise level selected or input by a user, such as "quiet," low," or "medium." In such embodiments, a specific sound-pressure level is associated with each qualitative noise level, and, as described below, processor power is adjusted to prevent laptop computer 200 from generating fan noise that exceeds the currently selected sound-pressure level. Alternatively, in some embodiments, user-selected target sound level 486 can be a specific quantitative noise level (such as a sound-pressure level in dB) that is selected or input by a user.

In the embodiment illustrated in FIG. 4, joint processor acoustic controller 401 includes a front end 410, an error module 430, and a GPU power setting module 450. Front end 410 determines a target temperature 411 associated with laptop computer 200, error module 430 determines a temperature error 431 based on target temperature 411, and GPU power setting module 450 determines one or more power setting values 451 for GPU 342 based on temperature error 431. Embodiments for determining target temperature 411, temperature error 431, and power setting values 451 are described below in conjunction with FIGS. 5-8C.

Target temperature 411 is a target operating temperature for one of multiple temperature-controlled devices included in laptop computer 200. Temperature-controlled devices with which target temperature 411 can be associated are devices that can be cooled by cooling fan 351 and cooling fan 352. Examples of such temperature-controlled devices include CPU 341, GPU 342, a surface of laptop 200 (such as palm rests 203 and/or a bottom surface of base portion 210 shown in FIG. 2), a memory device (such as RAM 344 or flash memory 346 shown in FIG. 3), and/or PCB 310 in FIG. 3. Target temperature 411 indicates a temperature at which a particular temperature-controlled device ideally remains given the current operating conditions of laptop 200, such as ambient temperature, computational workload, and the like. Thus, when a measured temperature of the temperature-controlled device (for example in telemetry information 481) is less than target temperature 411, more processor power can be consumed by CPU 341 and GPU 342. Therefore, a greater joint processor performance can be sustained without exceeding a target sound level (e.g., target sound level 486) or a target power or current level for laptop 200. Conversely, when a measured temperature of the temperature-controlled device is greater than target temperature 411, too much processor power is being consumed by CPU 341 and GPU 342. Therefore, the current joint processor performance cannot be sustained without exceeding the target sound level or the target power or current level for laptop 200. As described in greater detail below, joint processor acoustic controller 401 determines power setting values 451 for GPU 342 based on target temperature 411 and temperature error 431.

Error module 430 determines a temperature error 431 that is associated with laptop computer 200 given the current operating conditions of laptop 200. Error module 430 determines temperature error 431 based on target temperature 411 and a corresponding measured temperature, such as a temperature included in telemetry information 481. For example, when target temperature 411 is associated with CPU 341, the measured temperature is the measured temperature of CPU 341; when target temperature 411 is associated with GPU 342, the measured temperature is the measured temperature of GPU 342; when target temperature 411 is associated with a particular memory device, the measured temperature is the measured temperature of that particular memory device; and so on.

GPU power setting module 450 determines one or more power setting values 451 for GPU 342 based on temperature error 431. As noted above, the one or more power setting values 451 may include a GPU frequency cap, a frame-rate limit, and/or an active core count. In some embodiments, GPU power setting module 450 determines power setting values 451 based on a proportional control law. In such embodiments, a power setting value 451 for a particular power setting (e.g., GPU frequency cap) is determined by adjusting a present value for that particular power setting by an amount that is proportional to the temperature error 431 received from error module 430. For example, when a target temperature 411 for GPU 342 is 100° C. and the temperature error 431 associated with GPU 342 is +3° C. or +3%, a power setting value 451 for a particular GPU power setting is determined by GPU power setting module 450 to be 3% less than the current value for that particular GPU power setting.

Multi-Strategy GPU Power Control in an Acoustic Controller

In some embodiments, GPU power setting module 450 determines a single power setting value 451 for a single GPU power setting based on temperature error 431. In other embodiments, GPU power setting module 450 determines a power setting value 451 for each of multiple GPU power settings based on temperature error 431. In some embodiments, GPU power setting module 450 first determines a specific GPU power setting based on the current GPU power utilization rate, then determines a power setting value 451 for that specific GPU power setting based on temperature error 431. Because each GPU power setting is associated with a different approach for adjusting GPU power consumption, in such embodiments, GPU power setting module 450 selects a different approach for adjusting GPU power consumption based on the current GPU power utilization rate. One such embodiment is described below in conjunction with FIG. 5.

Figure 5:
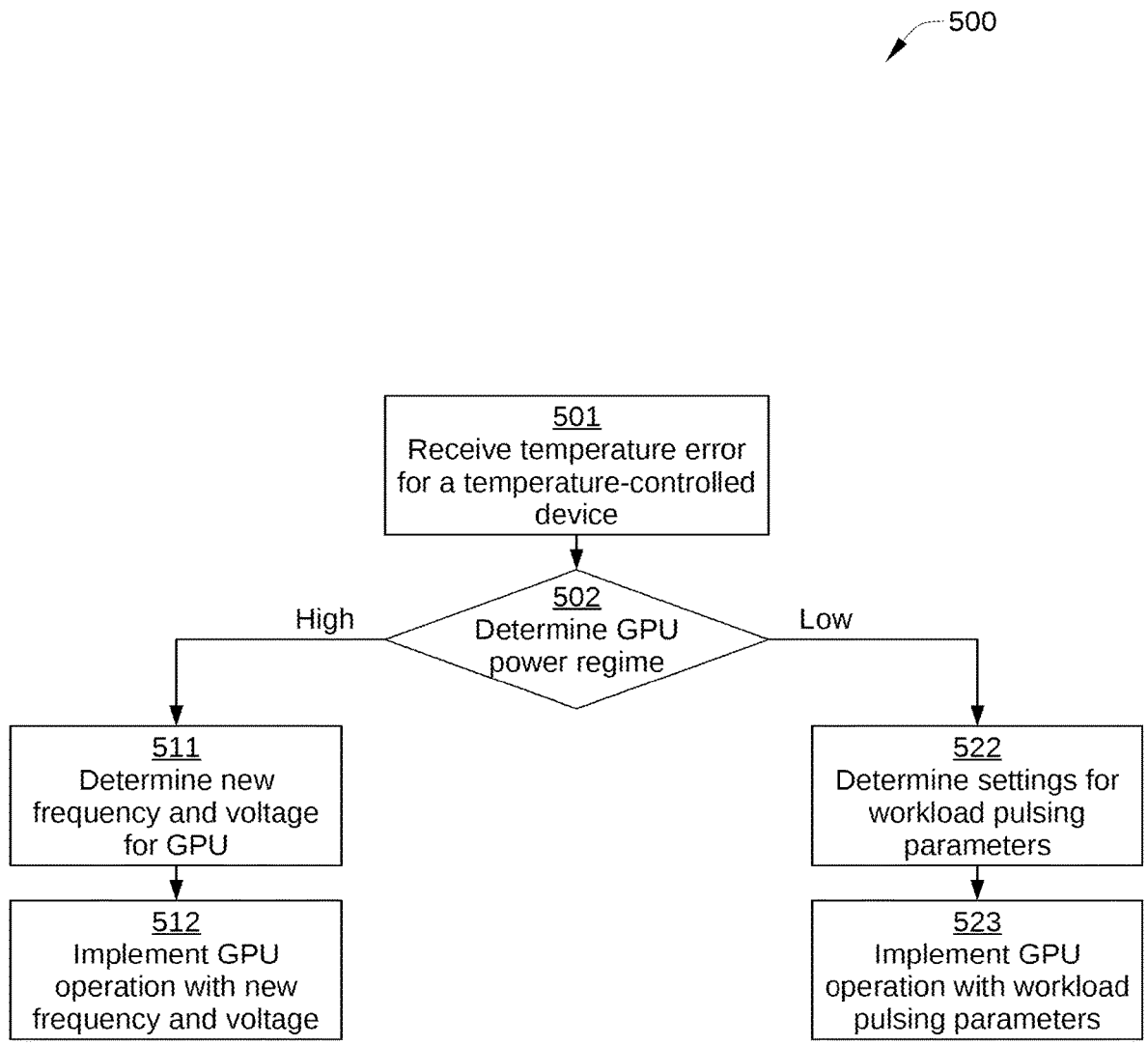
FIG. 5 sets forth a flowchart of method steps for controlling power consumption within a multi-processor computing device, according to various embodiments.

FIG. 5 sets forth a flowchart of method steps for controlling power consumption within a multi-processor computing device, according to various embodiments. Although the method steps are described with respect to the systems of FIGS. 1-4, any system configured to implement the method steps, in any order, falls within the scope of the various embodiments. Further, although the method steps are illustrated in a particular order, the method steps may be performed in parallel, and/or in a different order than those described herein. Also, the various method steps may be combined into fewer blocks, divided into additional blocks, and/or eliminated based upon a particular implementation.

As shown, a method 500 begins at step 501, where GPU power setting module 450 receives a temperature error for a temperature-controlled device included in laptop computer 200, such as temperature error 431. The temperature-controlled device can be any device or component of laptop computer 200 that is cooled directly or indirectly by cooling fan 351 and/or cooling fan 352, such as CPU 341, GPU 342, a surface of palm rests 203, a bottom surface of base portion 210, RAM 344, flash memory 346, and/or PCB 310.

In step 502, GPU power setting module 450 determines a current power regime of GPU 342. In the embodiment illustrated in FIG. 5, GPU power setting module 450 determines whether GPU 342 is operating in either a high-power regime or a low-power regime. In other embodiments, GPU power setting module 450 determines whether GPU 342 is operating in one of three or more different power regimes. For example, in some embodiments, GPU power setting module 450 determines whether GPU 342 is operating in one of a high-power regime, an intermediate power regime, or a low-power regime. When GPU power setting module 450 determines GPU 342 is operating in a high-power regime, method 500 proceeds to step 511; when GPU power setting module 450 determines GPU 342 is operating in a low-power regime, method 500 proceeds to step 522.

In some embodiments, GPU power setting module 450 determines that the current power regime of GPU 342 is in a low-power regime when a target power consumption for GPU 342 is less than a threshold value. In such embodiments, the threshold value indicates a target power consumption by GPU 342 that too low to be achieved by scaling core voltage and frequency together using a dynamic voltage and frequency scaling (DVFS) technique. Thus, the threshold value indicates a target power consumption of GPU 342 that is achieved by fixing the core voltage for GPU 342 to a low or minimum operational level and scaling frequency to adjust power consumption by GPU 342. In some embodiments, GPU power setting module 450 determines the present power regime of GPU 342 based on a measured GPU power. In embodiments of laptop computer 200 in which power consumption of GPU 342 cannot be directly measured, GPU power setting module 450 determines the present power regime of GPU 342 based on a calculated GPU power. For example, in such embodiments, GPU power setting module 450 may calculate the present power consumption of GPU 342 based on the present operating frequency and voltage of GPU 342 and/or on other GPU telemetry information that can be collected within laptop computer 200. Alternatively or additionally, in some embodiments, GPU power setting module 450 determines the present power regime of GPU 342 based on one or more power setting values, such as the present GPU frequency cap, frame-rate limit, and/or active core count.

In step 511, GPU power setting module 450 determines a new GPU core voltage and operating frequency using a conventional dynamic voltage and frequency scaling (DVFS) technique. In DVFS, increasing the GPU voltage/frequency improves the computational performance of GPU 342, but GPU 342 consumes more power. In such embodiments, GPU power setting module 450 employs DVFS to determine suitable power setting values 451 (for GPU core voltage and operating frequency) that adjust the power consumption of GPU 342 such that temperature error 431 is partially or completely compensated for. In such embodiments, GPU power setting module 450 determines a power setting value 451 for a particular GPU power setting in the present control cycle by adjusting a present value for that particular GPU power setting by an amount that is proportional to the temperature error 431. In such embodiments, GPU power setting module 450 determines one or more power setting values 451 using different gain or other proportionality factors depending on which temperature-controlled device of laptop computer 200 temperature error 431 is associated with.

In step 512, power control system 400 implements operation of GPU 342 with the new values for GPU core voltage and operating frequency (i.e., the power setting values 451 determined in step 511). Thus, in instances in which GPU 342 is in a high-power regime, power control system 400 compensates for changes in temperature of a particular temperature-controlled device in laptop 200 by adjusting GPU power with power setting values 451 determined by GPU power setting module 450 in step 522. Alternatively or additionally, in some embodiments, power setting values 451 are compared to other power setting values 461 before being implemented. In such embodiments, GPU power setting selector 470 determines which of power setting values 451 or power setting values 461 are implemented in GPU 342.

In step 522, which is performed when GPU power setting module 450 determines that GPU 342 is operating in a low-power regime, GPU power setting module 450 determines settings for workload pulsing parameters. That is, values for certain operating parameters of GPU 342 are determined so that GPU 342 alternates between an active state and an idle state while performing computational tasks. For example, in an instance in which GPU 342 generates video frames or completes some other frame-based workload, GPU 342 alternates between an active state for the generation of a certain number of video frames, then remains in an idle state for a certain duration of time before returning to the active state. Thus, GPU 342 completes computational tasks in pulses and, as a result, consumes less power than when continuously completing computational tasks. In such embodiments, one operating parameter that can be set to a suitable value in step 522 is a frame-rate limit, which indicates a cap on a rate of frame generation by GPU 342 (modulation cadence of work by GPU 342) and/or a maximum work-issue rate from CPU 341 for GPU 342 (modulation cadence of work provided to GPU 342 by CPU 341). Alternatively or additionally, in such embodiments any other work-load duty cycling parameter can be employed to reduce a rate of frame generation by GPU 342, such as an idle state duration value, etc. Similar to step 511, in step 522, in some embodiments, GPU power setting module 450 determines a power setting value 451 for a particular GPU power setting in the present control cycle by adjusting a present value for that particular GPU power setting by an amount that is proportional to the temperature error 431.

It is noted that conventional approaches for reducing power consumed by GPU 342 rely on reducing GPU operating frequency and/or GPU core voltage. However, the amount that such approaches can reduce the power consumed by GPU 342 is limited, in that GPU 342 cannot operate below a certain operating frequency or core voltage. Thus, according to various embodiments, when GPU 342 is operating in a low-power regime, power consumed by GPU 342 can be further reduced by implementing operating parameters of GPU 342 such that GPU 342 completes computational tasks in pulses. In such embodiments, computational efficiency of GPU 342 can be enhanced at this low level of power consumption by setting GPU core voltage to a low voltage (e.g., the lowest minimum voltage) while operating GPU 342 at a high frequency (e.g., the highest available operating frequency) during the pulses of computational work. As a result, GPU 342 operates with relatively computational efficiency even though consuming low power.

In step 523, power control system 400 implements operation of GPU 342 with the settings for workload pulsing parameters determined in step 522. Examples of workload pulsing parameters include workload pulse duration, framerate limit, and the like. Thus, in instances in which GPU 342 operates in a low-power regime, power control system 400 can compensate for changes in temperature of a particular temperature-controlled device in laptop 200 by adjusting GPU power with power setting values 451 determined by GPU power setting module 450 in step 522. Alternatively or additionally, in some embodiments, power setting values 451 are compared in step 522 to other power setting values 461 before being implemented. In such embodiments, GPU power setting selector 470 determines which of power setting values 451 or power setting values 461 are implemented in GPU 342.

Acoustic and Compute Performance Control Based on Device Temperature

In some embodiments, joint processor acoustic controller 401 of FIG. 4 enables a multi-processor computing device, such as laptop computer 200, to operate with high compute performance while complying with a target sound level for fan noise, such as target sound level 486. Specifically, joint processor acoustic controller 401 determines power setting values 451 for GPU 342 that adjust power consumption of GPU 342 to partially or completely compensate for a temperature error associated with a temperature-controlled device of laptop computer 200. In such embodiments, implementation of power setting values 451 reduces the temperature error by causing power consumption of GPU 342 to increase when a measured temperature is below a target temperature and by causing power consumption of GPU 342 to decrease when the measured temperature is above the target temperature. When the temperature error is reduced or eliminated, cooling fans 351 and 352 operate at fan speeds that result in fan noise being generated that complies with target sound level 486. Thus, in some embodiments, joint processor acoustic controller 401 enables a trade-off between the computing performance of GPU 342 (which is a function of power consumed by GPU 342) and a sound level of the fan noise generated by laptop computer 200. One such embodiment is described below in conjunction with FIG. 6.

Figure 6:
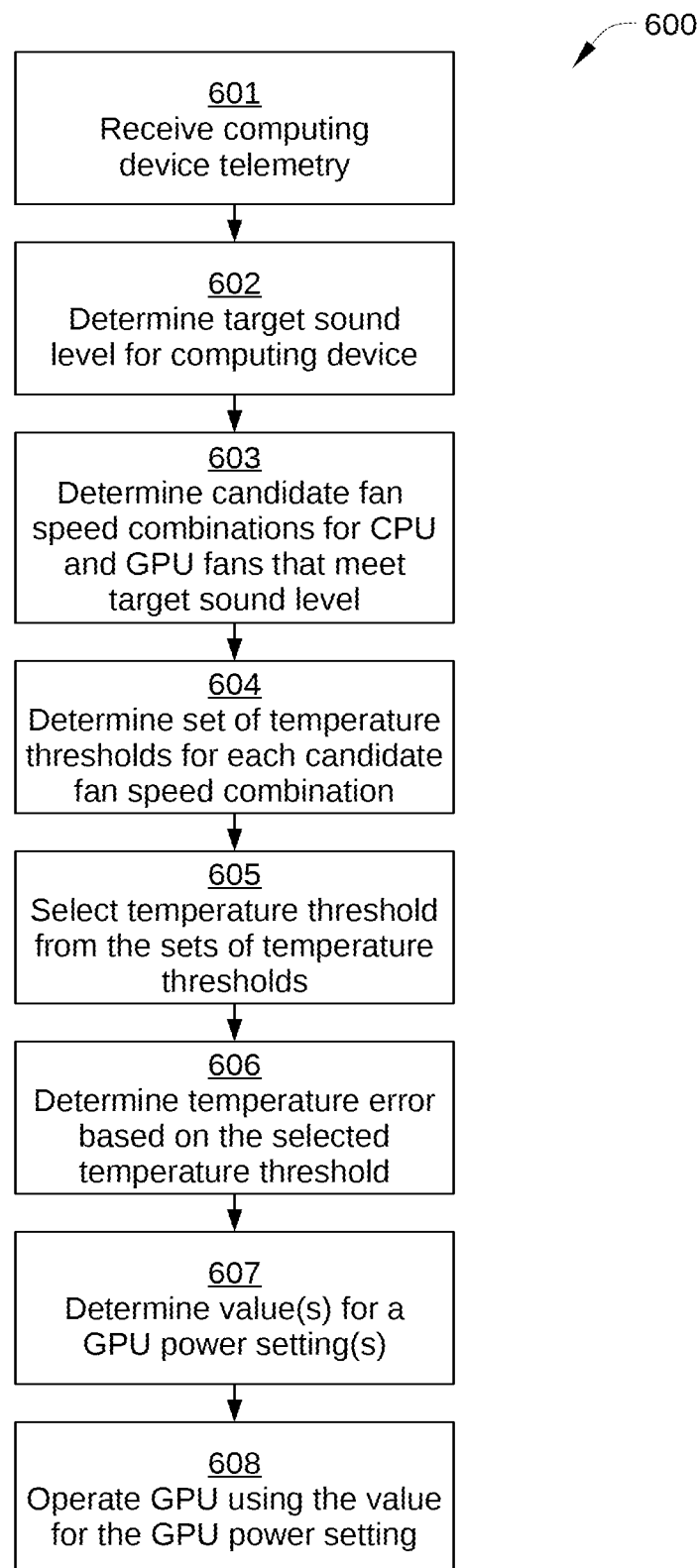
FIG. 6 sets forth a flowchart of method steps for controlling power consumption within a multi-processor computing device based on device temperature, according to various embodiments.

FIG. 6 sets forth a flowchart of method steps for controlling power consumption within a multi-processor computing device based on a device temperature, according to various embodiments. Although the method steps are described with respect to the systems of FIGS. 1-4, any system configured to implement the method steps, in any order, falls within the scope of the various embodiments. Further, although the method steps are illustrated in a particular order, the method steps may be performed in parallel, and/or in a different order than those described herein. Also, the various method steps may be combined into fewer blocks, divided into additional blocks, and/or eliminated based upon a particular implementation.

As shown, a method 600 begins at step 601, where joint processor acoustic controller 401 receives telemetry information 481, such as processor information and/or fan information. Processor information can include temperatures of the various temperature-controlled devices included in laptop computer 200, such as CPU 341, GPU 342, a surface of palm rests 203, a bottom surface of base portion 210, RAM 344, flash memory 346, and/or PCB 310. Alternatively or additionally, in some embodiments, telemetry information 481 can include fan information, such as fan speed and/or a fan noise level.

In step 602, joint processor acoustic controller 401 determines a target sound level for laptop computer 200, for example via front end 410. In some embodiments, the target sound level is determined based on a user setting or other user input, such as the selection of a specific qualitative noise level ("quiet," low," or "medium") as a target fan noise setting or a specific quantitative noise level (such as a sound-pressure level in dB) as a target fan noise setting. Alternatively or additionally, in some embodiments, the target sound level can be determined by joint processor acoustic controller 401 based on some other working condition of laptop 200, such as a power state of laptop computer 200 (e.g., running on AC power vs. battery power), a particular application being run on laptop computer 200, a time of day, etc.

In step 603, joint processor acoustic controller 401 determines candidate fan speed combinations for cooling fan 351 (which primarily cools GPU 342) and cooling fan 352 (which primarily cools CPU 341), for example via front end 410. The candidate fan speed combinations are combinations of the fan speed for cooling fan 351 and the fan speed for cooling fan 352 that are known to result in a fan noise level that does not exceed the target sound level determined in step 602. In some embodiments, the candidate fan speed combinations are determined based on a sound level table for laptop computer 200 that indicates a system sound level value for each possible combination of the different fan speeds of cooling fan 351 and cooling fan 352. An embodiment of a sound level table is described below in conjunction with FIG. 7.

FIG. 7 illustrates a sound level table 700 for a multi-processor computing device, according to various embodiments. As shown, sound level table 700 includes a different sound level value 703 for each combination of CPU fan speeds 701 (for cooling fan 351) and GPU fan speeds 702 (for cooling fan 352). In the embodiment illustrated in FIG. 7, there are seven CPU fan speeds 701 (speeds 1-7) and seven GPU fan speeds 702 (speeds 1-7). In other embodiments, the number of CPU fan speeds 701 is different than the number of GPU fan speeds 702. Alternatively or additionally, in some embodiments, there can be more than seven or fewer than seven CPU fan speeds and/or more than seven or fewer than seven GPU fan speeds.

In sound level table 700, each sound level value 703 corresponds to a tuple of fan speeds: (CPU fan speed, GPU fan speed). In some embodiments, each sound level value 703 is a value that is measured for one or more representative instances of laptop 200, for example prior to mass production of laptop 200. In some embodiments, each of the various sound level values 703 indicates a range of sound-pressure levels (e.g., 10.0 dB to 19.9 dB), rather than a single discrete sound level. In such embodiments, the range of sound-pressure levels for each sound level value 703 does not overlap with the range of sound-pressure levels for other sound level values 703. For example, in one such embodiment, sound level 1 (SL1) is associated with sound-pressure levels from 10.0 dB to 19.9 dB, sound level 2 (SL2) is associated with sound-pressure levels from 20.0 dB to 29.9 dB, sound level SL3 (SL3) is associated with sound-pressure levels from 30.0 dB to 39.9 dB, and so on.

In some embodiments, candidate fan speed combinations are determined in step 603 by selecting the fan speed combinations that are associated with the target sound level determined in step 602. For example, in one such embodiment, when the target sound level determined in step 602 is sound level 6 (SL6), the candidate fan speed combinations include the fan speed tuple CPU fan speed 7, GPU fan speed 1 (referred to herein as combination 7-1), combination 7-2, combination 6-3, combination 6-4, combination 6-5, combination 6-6, combination 5-6, combination 4-6, combination 3-6, combination 2-7, and combination 1-7. Alternatively, in some embodiments, candidate fan speed combinations are determined in step 603 by selecting a subset of the fan speed combinations that are associated with the target sound level determined in step 602. In such embodiments, the subset of the fan speed combinations that are selected are the fan speed combinations that correspond to the highest fan speeds for the CPU and GPU fans. For example, in one such embodiment, when the target sound level determined in step 602 is sound level 6 (SL6), the candidate fan speed combinations that correspond to the highest fan speeds (circled in FIG. 7) include combination 7-1, combination 7-2, combination 6-6, combination 2-7, and combination 1-7. Other fan speed combinations shown in sound level table 700 are associated with the correct sound level (in this case SL5), but do not allow as much processor performance as the above fan speed combinations.

Returning to FIG. 6, in some embodiments, in step 603, the candidate fan speed combinations can be determined based on other sound level information than a sound level table similar to sound level table 700. For example, in some embodiments, the candidate fan speed combinations can be determined based on the intersection of a three-dimensional surface (representing a continuum of sound level values associated with the different possible combinations of CPU fan speeds and GPU fan speeds) and a plane (representing target sound level 486). In one such embodiment, the height of a particular point on the three-dimensional surface above a rectangular portion of a plane represents a sound level value (or sound pressure level range), where one dimension of the plane (e.g., a first side of the plane) corresponds to the range of possible CPU fan speeds and the other dimension of the plane (e.g., a second side of the plane) corresponds to the range of possible GPU fan speeds. In such embodiments, for each combination of CPU fan speed and GPU fan speed, there is a corresponding point on the three-dimensional surface. In such embodiments, the intersection of the three-dimensional surface and the plane representing the constant value of target sound level 486 is a curve, where each point on the curve corresponds to a combination of a specific CPU fan speed and a specific GPU fan speed. In some embodiments, each point on the curve can represent a candidate fan speed combination that meets target sound level 486.

In step 604, joint processor acoustic controller 401 determines a set of device temperature thresholds for each candidate fan speed combination determined in step 603, for example via front end 410. Each set of device temperature thresholds includes one entry for each temperature-controlled device of laptop computer 200 whose temperature is taken into account in method 600. For example, in an instance in which CPU temperature, GPU temperature, DRAM temperature, and skin temperature are all inputs for method 600, joint processor acoustic controller 401 determines the following set of device temperature thresholds for each of M candidate fan speed combinations: ($TT_{CPU}$, $TT_{GPU}$, $TT_{RAM}$, $TT_{Skin}$)$_{combom}$. The threshold temperature for a particular temperature-controlled device indicates a temperature of that particular device at which an associated fan changes from the current fan speed to another fan speed. For example, the device temperature threshold for the CPU ($TT_{CPU}$) indicates a temperature of CPU 341 at which cooling fan 351 changes speed from the current fan speed to a higher or lower fan speed. In another example, the device temperature threshold for the CPU ($TT_{RAM}$) indicates a temperature of RAM 344 at which a particular cooling fan (e.g., cooling fan 351 or 352) changes speed from the current fan speed to a higher or lower fan speed. In some embodiments, joint processor acoustic controller 401 determines the set of device temperature thresholds for each of M candidate fan speed combinations based on information included in fan speed tables for laptop computer 200. Embodiments of various fan speed tables are described below in conjunction with FIGS. 8A-8C.

Figure 8A:
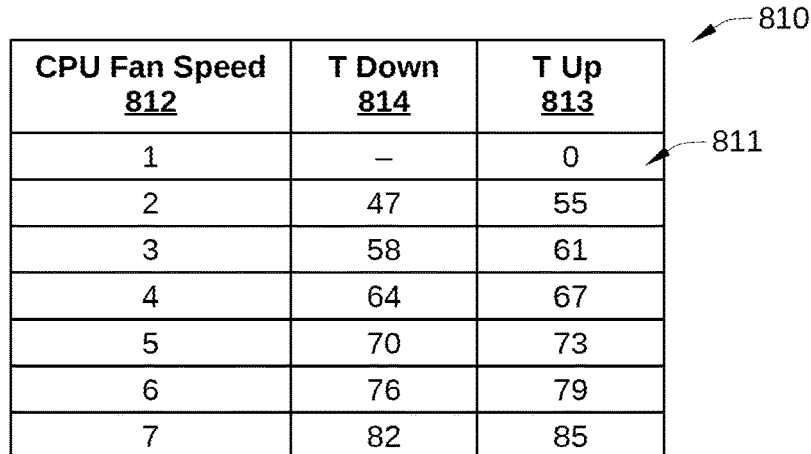
FIGS. 8A, 8B, and 8C illustrate different fan speed tables for the laptop computer of FIG. 2, according to various embodiments.

FIG. 8A illustrates a fan speed table 810 for a multi-processor computing device, according to various embodiments. In general, fan speed tables indicate, via a plurality of device temperature threshold values, temperature bands for a particular temperature-controlled device of laptop 200 and the corresponding fan speed at which a specific cooling fan operates for each temperature band. In the instance illustrated in FIG. 8A, fan speed table 810 includes temperature threshold values 811 for each of the seven possible fan speeds 812 of cooling fan 351. Temperature threshold values 811 indicate the various temperatures of CPU 341 that cause an operating system or other controller of laptop 200 to change the fan speed of cooling fan 351 from a current fan speed 812 to a higher or lower fan speed 812.

In the embodiment illustrated in FIG. 8A, fan speed table 810 includes two temperature threshold values 811 for each fan speed 812 of cooling fan 351: a temperature up value 813 and a temperature down value 814. The temperature up value 813 for a particular fan speed indicates a temperature at which cooling fan 351 changes to a higher fan speed, because CPU 341 is increasing in temperature and more cooling thereof is required. The temperature down value 814 for a particular fan speed indicates a temperature at which cooling fan 351 changes to a lower fan speed, because CPU 341 is decreasing in temperature and less cooling thereof is required. For example, when CPU 341 is determined to be at 77° C. or 78° C., cooling fan 351 operates at fan speed 6. However, when CPU 341 is then determined to increase to 79° C., the temperature of CPU 341 matches the temperature up value 813 for fan speed 6, and therefore cooling fan 351 begins operating at the next faster fan speed (fan speed 7). Conversely, when CPU 341 is instead determined to decrease from 77° C. or 78° C. to 76° C., the temperature of CPU 341 matches the temperature down value 814 for fan speed 6, and therefore cooling fan 351 begins operating at the next slower fan speed (fan speed 5). Thus, fan speed table 810 indicates the various temperature bands of CPU 341 within which cooling fan 351 remains at the same fan speed and the various device temperature thresholds of CPU 341 at which cooling fan 351 changes to a different fan speed.

Figure 8B:
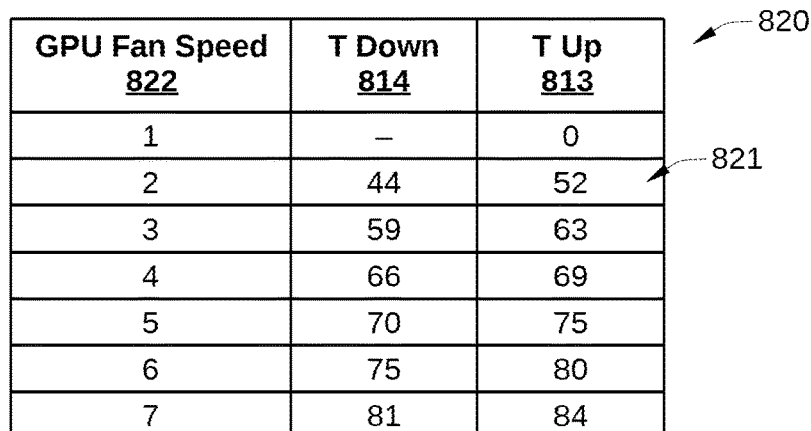

FIG. 8B illustrates a fan speed table 820 for a multi-processor computing device, according to various embodiments. Fan speed table 820 is similar to fan speed table 810 in FIG. 8A, except that fan speed table 820 provides device temperature threshold information and fan speed information for a different cooling fan and/or different temperature-controlled device than fan speed table 810. In the embodiment illustrated in FIG. 8B, fan speed table 820 includes temperature threshold values 821 for each of the seven possible fan speeds 822 of cooling fan 352. Temperature threshold values 821 indicate the various temperatures of GPU 342 that cause an operating system or other controller of laptop 200 to change the fan speed of cooling fan 352 from a current fan speed 822 to a higher or lower fan speed 822.

Figure 8C:
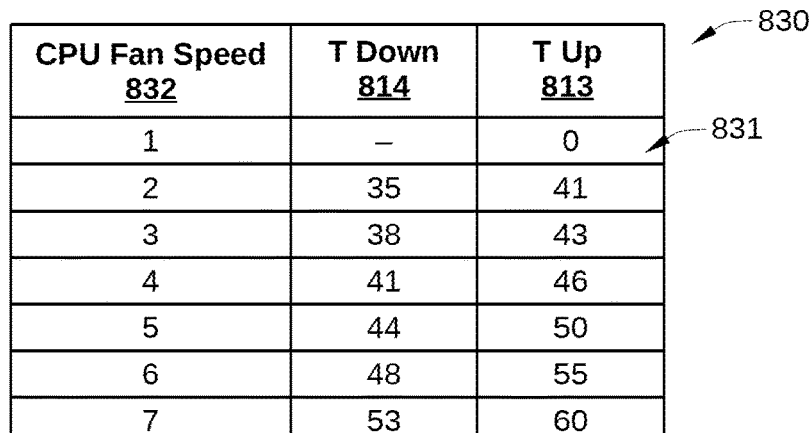

FIG. 8C illustrates a fan speed table 830 for a multi-processor computing device, according to various embodiments. Fan speed table 830 is similar to fan speed table 810 in FIG. 8A, except that fan speed table 830 provides device temperature threshold information and fan speed information for a different cooling fan and/or different temperature-controlled device than fan speed table 810. In the embodiment illustrated in FIG. 8C, fan speed table 830 includes temperature threshold values 831 for each of the seven possible fan speeds 832 of cooling fan 351, which is also associated with cooling CPU 341. Temperature threshold values 831 indicate the various temperatures of RAM 344 that cause an operating system or other controller of laptop 200 to change the fan speed of cooling fan 351 from a current fan speed 832 to a higher or lower fan speed 832.

FIGS. 8A-8C illustrate some examples of fan speed tables for the operation of laptop computer 200. In some embodiments, different and/or additional fan speed tables can also be employed for the operation of laptop computer 200, such as a fan speed table associated with a surface of palm rests 203, a bottom surface of base portion 210, flash memory 346, and/or PCB 310. In each case, each such fan speed table includes device temperature threshold values for the possible fan speeds of cooling fan 351 or cooling fan 352. Thus, in some instances, multiple fan speed tables for laptop computer 200 can include device temperature threshold values for the possible fan speeds of the same cooling fan. For example, speed table 810 and fan speed table 830 each include device temperature threshold values for the seven possible fan speeds of cooling fan 351. Thus, in some instances, depending on the temperature of CPU 342 and the temperature of RAM 344, fan speed table 810 and fan speed table 830 can indicate different fan speeds for cooling fan 351. In such instances, the higher fan speed generally takes precedence over the lower fan speed.

Returning to FIG. 6, in step 604, joint processor acoustic controller 401 determines the following set of device temperature thresholds for each of M candidate fan speed combinations: $(TT_{CPU}, TT_{GPU}, TT_{RAM}, TT_{Skin})_{ComboM}$, using information included in the fan speed tables of laptop computer 200, such as fan speed table 810 in FIG. 8A, fan speed table 820 in FIG. 8B, and fan speed table 830 in FIG. 8C.

For example, in some embodiments, for a particular candidate fan speed combination, a device temperature threshold value is selected from each fan speed table for laptop computer 200. In such embodiments, the device temperature threshold value that is selected from a particular fan speed table is determined based on the appropriate fan speed of the particular candidate fan speed combination. Thus, using fan speed table 810 of FIG. 8A as an example, when the CPU fan speed for the particular candidate fan speed combination is fan speed 5, then the device temperature threshold value that is selected from fan speed table 810 is either 76° C. or 79° C. As shown in fan speed table 810, in such embodiments, the device temperature threshold value selected for a specific fan speed can be either a temperature up value (such as a temperature up value 813 in FIG. 8A) or a temperature down value (such as a temperature down value 814 in FIG. 8A). Therefore, the device temperature threshold value that is selected from a particular fan speed table is further determined based on whether the current conditions of laptop computer 200 will require higher temperature operation or lower temperature operation of laptop computer 200. Using fan speed table 810 of FIG. 8A again as an example, when the current fan speed for the CPU fan is greater than the CPU fan speed for the particular candidate fan speed combination (e.g., fan speed 6), the device temperature threshold value that is selected from fan speed table 810 is the temperature down value 814 for fan speed 6, which is 76° C. Conversely, when the current fan speed for the CPU fan is equal to or less than the CPU fan speed for the particular candidate fan speed combination (e.g., fan speed 5), the device temperature threshold value that is selected from fan speed table 810 is the temperature up value 813 for fan speed 5, which is 79° C. For one candidate fan speed combination, the above procedure is repeated for each entry in the set of device temperature threshold values $(TT_{CPU}, TT_{GPU}, TT_{RAM}, TT_{Skin})_{comboM}$ for that candidate fan speed combination, where each entry is a device temperature threshold value selected from a different fan speed table.

In step 605, joint processor acoustic controller 401 (for example via front end 410) selects a specific device temperature threshold value from the sets of device temperature threshold values for all of the candidate fan speed combinations. This specific device temperature threshold value is subsequently employed to determine a temperature error that indicates how power consumption of GPU 342 is to be adjusted. In some embodiments, the specific device temperature threshold value is selected in two steps. First, the most restrictive or "worst-case" device temperature threshold value is determined in each set of device temperature threshold values. Thus, for each candidate fan speed combination, a single device temperature threshold value is determined. Second, of the worst-case device temperature threshold values, the device temperature threshold value having the smallest temperature error is selected for determining how GPU power consumption is to be adjusted so that laptop computer 200 complies with target sound level 486 in FIG. 4.

In some embodiments, the most restrictive device temperature threshold value is determined for a particular set of device temperature threshold values based on a comparison of the device temperature threshold values to a corresponding measured temperature. More specifically, for a particular candidate fan speed combination, the most restrictive device temperature threshold value in the set for that candidate fan speed combination is the device temperature threshold value that has the relatively hottest corresponding measured temperature. For example, given a particular candidate fan speed combination that has a set of device temperature threshold values $(TT_{CPU}, TT_{CPU}, TT_{RAM}, TT_{Skin})$, device temperature threshold value $TT_{CPU}$ is considered the most restrictive device temperature threshold value in the set when a measured temperature for GPU 342 exceeds $TT_{CPU}$ by more than how much a measured temperature for CPU 341 exceeds $TT_{CPU}$, by more than how much a measured temperature for RAM 344 exceeds $TT_{RAM}$, and by more than how much a measured temperature for RAM 344 exceeds $TT_{RAM}$. In instances in which none of the measured temperatures for the various temperature-controlled devices of laptop computer 200 exceeds the corresponding device temperature threshold value in the set, a device temperature threshold value is considered the most restrictive device temperature threshold value in the set when the corresponding measured temperature is closest to the device temperature threshold value. For example, device temperature threshold value $TT_{CPU}$ is considered the most restrictive device temperature threshold value in the set when a measured temperature for GPU 342 is less than $TT_{CPU}$ by 2° C., a measured temperature for CPU 341 is less than $TT_{CPU}$ by 5° C., a measured temperature for RAM 344 is less than $TT_{RAM}$ by 8° C., and a measured temperature for RAM 344 is less than $TT_{RAM}$ by 10° C.

In some embodiments, the device temperature threshold value that is selected in step 605 is selected from the most restrictive device temperature threshold values for the candidate fan speed combinations, which are described above. In some embodiments, the specific device temperature threshold value that is selected in step 605 is the device temperature threshold value that has the lowest error relative to a corresponding measured temperature. For example, device temperature threshold value $TT_{GPU}$ is selected in step 605 when a measured temperature for GPU 342 has an error from $TT_{GPU}$ of 2° C., a measured temperature for CPU 341 has an error from $TT_{CPU}$ of 7° C., a measured temperature for RAM 344 has an error from $TT_{RAM}$ of 4° C., and a measured temperature for RAM 344 has an error from $TT_{RAM}$ of 9° C.

In the embodiment described above, a device temperature threshold value is selected from the most restrictive device temperature threshold values based on temperature error in ° C. In other embodiments, a device temperature threshold value is selected from the most restrictive device temperature threshold values based on percentage of temperature error, or any other quantitative comparison of the most restrictive device temperature threshold values for the candidate fan speed combinations.

In step 606, joint processor acoustic controller 401 (for example via error module 420) determines temperature error 431 associated with laptop computer 200 for the current control cycle. In some embodiments, temperature error 431 is a temperature difference between the device temperature threshold value selected in step 605 and the corresponding measured temperature. In some embodiments, temperature error 431 is calculated as a difference in ° C. between the device temperature threshold value selected in step 605 and the corresponding measured temperature. Alternatively or additionally, in some embodiments, temperature error 431 is calculated as a percentage difference between the device temperature threshold value selected in step 605 and the corresponding measured temperature.

It is noted that any of the most restrictive device temperature threshold values for each candidate fan speed combination determined in step 605 can be employed to determine temperature error 431 in step 606. This is because each of these most restrictive device temperatures will, by definition, enable compliance of laptop computer 200 with target sound level 486. However, as described above in step 605, in some embodiments, the most restrictive device temperature threshold value that has the lowest error relative to a corresponding measured temperature is employed to determine temperature error 431 in step 606. As a result, the amount of change in temperature that is implemented to meet target sound level 486 (i.e., temperature error 431) is minimized or otherwise reduced compared to the amount of change in temperature associated with the other most restrictive device temperature threshold values.

In step 607, joint processor acoustic controller 401 determines values for one or more power settings for GPU 342, for example via GPU power setting module 450. In some embodiments, method 500 of FIG. 5 is employed to generate the one or more power settings for GPU 342, such as power setting values 451.

In step 608, laptop computer 200 performs computational work, such as computational tasks 406 from push buffer 405 or other computational operations. In step 608, power control system 400 ensures that such computational operations are performed while GPU 342 is operated using power setting values 451.

It is noted that in method 600, joint processor acoustic controller 401 does not set an explicit target power level for GPU 342. Instead, joint processor acoustic controller 401 selects from multiple different power setting values 451 (e.g., GPU core frequency, frame rate, and/or active core count) to operate GPU 342 as efficiently as possible in both high-power and low-power regimes, and for different workload types. It is further noted that in conventional multi-processor systems, such as discrete GPU laptops, the sound level can be controlled by raising or lowering the total processor power that is available for the CPU and GPU in response to a user-selected sound or performance level. However, as working conditions change for such a system, such as ambient temperature and/or workload, the fixed total processor power is often redistributed between the CPU and GPU, changing the temperatures of the CPU and GPU and causing system sound level to vary. By contrast, joint processor acoustic controller 401 can control power consumption of the GPU (and therefore also the CPU) in compliance with a specific sound level, even while adapting to changes in ambient temperature and workload.

Compute Performance and Battery Drain Rate Control in a Multi-Processor Computing Device Returning to FIG. 4, joint processor power controller 402 determines one or more power setting values 461 for GPU 342, such as a GPU frequency cap, a frame-rate limit, and/or an active core count. Similar to power setting values 451, each of the one or more power setting values 461 affects a rate at which power is consumed by GPU 342. Joint processor power controller 402 determines power setting values 461 that enable laptop computer 200 to operate with the highest performance while complying with target processor power or target battery drain rate 487.

In some embodiments, joint processor power controller 402 determines power setting values 461 based on certain telemetry information 482 associated with laptop computer 200. Telemetry information 482 can include processor information, such as GPU temperature and CPU temperature. Alternatively or additionally, in some embodiments, telemetry information 482 can include battery information, such as present voltage, state of charge, and/or temperature. In addition, joint processor power controller 402 determines power setting values 461 based on one or more static operating settings, such as a user-selected target battery drain rate 487 for laptop computer 200 or a platform-specified maximum safe battery drain rate. For example, in some embodiments, user-selected target battery drain rate 487 specifies a target performance level, such as "Maximum Performance," Balanced Performance," or "Maximum Runtime," a specific position on a performance slider, and the like. Alternatively or additionally, in some embodiments, user-selected target battery drain rate 487 specifies a target battery life duration, such as "short," "medium," or "long," a specific position on a battery life slider, and the like. In such embodiments, a specific total processor power (e.g., the total power allocated to CPU 341 and GPU 342) is associated with each target performance level or target battery life duration. As described below, processor power consumed by GPU 342 is adjusted via power setting values 461 to prevent laptop computer 200 from exceeding a target battery drain rate, failing to meet a target battery life, and/or exceeding a total processor power (such as a target total processor power (TPP) 421 associated with laptop computer 200).

In the embodiment illustrated in FIG. 4, joint processor power controller 402 includes a front end 420, an error module 440, and a GPU power setting module 460. Front end 420 determines target TPP 421, error module 430 determines a GPU power error 441 based on target TPP 421, and GPU power setting module 460 determines one or more power setting values 461 for GPU 342 based on GPU power error 441. Embodiments for determining target TPP 421, GPU power error 441, and power setting values 461 are described below in conjunction with FIGS. 9 and 10.

Target TPP 421 is a target total processing power consumed by CPU 341 and GPU 342 in laptop computer 200. In some embodiments, target TPP 421 is applicable when laptop computer 200 is operating on battery power and therefore is power-constrained. Target TPP 421 indicates a level of power consumption at which CPU 341 and GPU 342 ideally remain given the current operating conditions of laptop 200, such as ambient temperature, computational workload, and the like. Thus, when the actual total processing power of laptop computer 200 is less than target TPP 421, joint processor power controller 402 determines one or more power setting values 461 so that more processor power can be consumed by CPU 341 and GPU 342. Conversely, when the actual total processing power of laptop computer 200 is greater than target TPP 421, joint processor power controller 402 determines one or more power setting values 461 so that less processor power is consumed by CPU 341 and GPU 342. As a result, a greater joint processor performance can be sustained without exceeding a specified target processor power or target battery drain rate 487 for laptop 200. As described in greater detail below, joint processor power controller 402 determines power setting values 461 for GPU 342 based on target TPP 421 and GPU power error 441.

In some embodiments, front end 420 determines target TPP 421 based on various factors. In some embodiments, such factors include one or more of a system power that is utilized by the electronic components 340 of laptop computer 200 (excluding CPU 341 and GPU 342); one or more telemetry values, such as the present GPU core frequency, the present CPU core frequency, a present voltage of the battery of laptop computer 200, a present temperature of the battery, and/or a present charge state of the battery (e.g., measured battery voltage). In some embodiments, front end 420 determines target TPP 421 by subtracting the system power from the total available power for laptop 200. In such embodiments, the total available power for laptop computer 200 can be indicated by target processor power or target battery drain rate 487.

In some embodiments, a different fixed current at the output of the battery is maintained for each value for target TPP 421. Thus, in such embodiments, as battery voltage slowly drops over the battery discharge period and the fixed current is maintained, the actual power made available for processor utilization (the total processor power) also slowly drops over the runtime of the battery. As a result, in such embodiments, the specific value of target TPP 421 changes over the runtime of the battery, even though a user-selected qualitative setting remains the same. In some embodiments, the different values of fixed current for each value of target TPP 421 may be stored in a look-up table in laptop computer 200, for example in a system BIOS associated with laptop computer 200 (system BIOS is not shown in FIG. 4), or in control circuits 345 or flash memory 346 (shown in FIG. 3).

In some embodiments, target processor power or target battery drain rate 487 includes a total processor power lower limit that indicates a minimum total power to be available for consumption by CPU 341 and GPU 342, for example to maintain a minimum acceptable performance floor for laptop computer 200. In such embodiments, the total processor power lower limit indicates a user-specified performance floor for laptop computer 200. In some embodiments, the total processor power lower limit is configured to override target TPP 421, so that computing performance of laptop computer 200 does not fall below a certain level, even though in that case the battery drain rate of laptop computer 200 is increased. In some embodiments, the total processor power lower limit is applicable when laptop computer 200 is operating on battery power and therefore is power-constrained. In some embodiments, the total processor power lower limit is a numerical value that is associated with a particular user-selected qualitative setting, such as "long battery life/lower performance," "medium battery life/medium performance," or "shorter battery life/high performance."

Error module 440 determines GPU power error 441 given the current operating conditions of laptop 200. Error module 440 determines GPU power error 441 based on target TPP 421 and certain telemetry information 484, such as processing power consumed by CPU 341, processing power consumed by GPU 342, and/or the present settings for power setting values 461. As noted above, the present settings for power setting values 461 can include one or more of a GPU frequency cap, a frame-rate limit, and/or an active core count.

GPU power setting module 460 determines one or more power setting values 461 for GPU 342 based on GPU power error 441. In some embodiments, GPU power setting module 460 determines power setting values 461 similar to the process by which GPU power setting module 450 determines power setting values 451. Thus, in such embodiments, GPU power setting module 460 determines power setting values 461 based on a proportional control law. In such embodiments, a power setting value 461 for a particular power setting (e.g., GPU frequency cap) is determined by adjusting a present value for that particular power setting by an amount that is proportional to the GPU power error 441 received from error module 440.

Multi-Strategy GPU Power Control in a Battery Drain-Rate Controller

In some embodiments, GPU power setting module 460 determines a single power setting value 461 for a single GPU power setting based on GPU power error 441. In other embodiments, GPU power setting module 460 determines a power setting value 461 for each of multiple GPU power settings based on GPU power error 441. In some embodiments, GPU power setting module 460 first determines a specific GPU power setting to be adjusted based on the current GPU power utilization rate, then determines a power setting value 461 for that specific GPU power setting based on GPU power error 441. Because each GPU power setting is associated with a different approach for adjusting GPU power consumption, in such embodiments, GPU power setting module 460 selects a different approach for adjusting GPU power consumption based on the current GPU power utilization rate. One such embodiment is described below in conjunction with FIG. 9.

Figure 9:
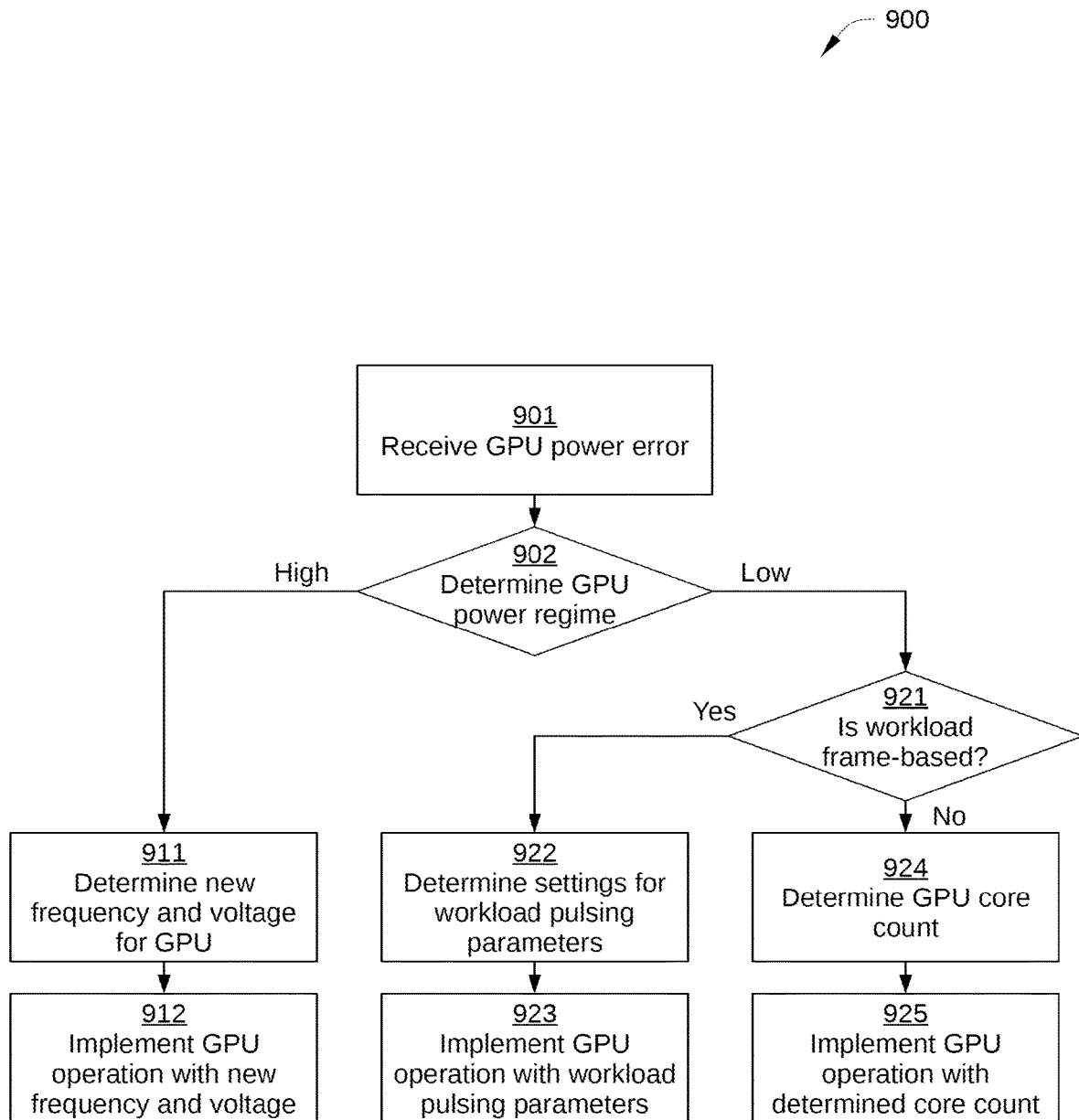
FIG. 9 sets forth a flowchart of method steps for controlling power consumption within a multi-processor computing device, according to other various embodiments.

FIG. 9 sets forth a flowchart of method steps for controlling power consumption within a multi-processor computing device, according to various embodiments. Although the method steps are described with respect to the systems of FIGS. 1-4 and 7-8C, any system configured to implement the method steps, in any order, falls within the scope of the various embodiments. Further, although the method steps are illustrated in a particular order, the method steps may be performed in parallel, and/or in a different order than those described herein. Also, the various method steps may be combined into fewer blocks, divided into additional blocks, and/or eliminated based upon a particular implementation.

It is noted that various method steps of FIG. 9 are similar to corresponding method steps in method 500 of FIG. 5. Accordingly, such method steps in FIG. 9 are numbered similarly to the corresponding method steps in method 500 for ease of reference.

As shown, a method 900 begins at step 901, where GPU power setting module 460 receives a GPU power error for laptop computer 200, such as GPU power error 441. In step 902, GPU power setting module 460 determines a current power regime of GPU 342. In the embodiment illustrated in FIG. 9, GPU power setting module 460 determines whether GPU 342 is operating in either a high-power regime or a low-power regime. In other embodiments, GPU power setting module 460 determines whether GPU 342 is operating in one of three or more different power regimes. In the embodiment illustrated in FIG. 9, when GPU power setting module 460 determines GPU 342 is operating in a high-power regime, method 900 proceeds to step 911; when GPU power setting module 460 determines GPU 342 is operating in a low-power regime, method 900 proceeds to step 922.

In some embodiments, GPU power setting module 460 determines the present power regime of GPU 342 based on a measured GPU power. In embodiments of laptop computer 200 in which power consumption of GPU 342 cannot be directly measured, GPU power setting module 460 determines the present power regime of GPU 342 based on a target GPU power. For example, in some embodiments, when a target power consumption by GPU 342 is too low to be achieved by scaling core voltage and frequency together using a DVFS technique, GPU power setting module 460 determines the present power regime of GPU 342 is in a low-power regime.

In step 911, GPU power setting module 460 determines a new GPU core voltage and operating frequency using a conventional dynamic voltage and frequency scaling (DVFS) technique. In such embodiments, GPU power setting module 460 employs DVFS to determine suitable power setting values 461 (for GPU core voltage and operating frequency) that adjust the power consumption of GPU 342 such that GPU power error 441 is partially or completely compensated for. In such embodiments, GPU power setting module 460 determines a power setting value 461 for a particular GPU power setting in the present control cycle by adjusting a present value for that particular GPU power setting by an amount that is proportional to GPU power error 441. In such embodiments, GPU power setting module 460 determines one or more power setting values 461 using different gain or other proportionality factors, depending on which temperature-controlled device of laptop computer 200 GPU power error 441 is associated with.

In step 912, power control system 400 implements operation of GPU 342 with the new values for GPU core voltage and operating frequency (i.e., the power setting values 461 determined in step 911). Alternatively or additionally, in some embodiments, power setting values 461 are compared to other power setting values 451 by GPU power setting selector 470 before being implemented. In such embodiments, GPU power setting selector 470 determines which of power setting values 451 or power setting values 461 are implemented in GPU 342.

In step 921, GPU power setting module 460 determines whether the current workload for laptop computer 200 is frame-based, such as when GPU 342 is tasked to generate video frames. When GPU power setting module 460 determines GPU 342 has a frame-based workload, method 900 proceeds to step 922; when GPU power setting module 460 determines GPU 342 has a workload that is not frame-based, method 900 proceeds to step 924.

In step 922, GPU power setting module 460 determines settings for workload pulsing parameters. That is, values for certain operating parameters of GPU 342 are determined so that GPU 342 alternates between an active state and an idle state while performing computational tasks. As noted above, when GPU 342 completes computational tasks in pulses based on such pulsing parameters, GPU 342 consumes less power than when continuously completing computational tasks. As a result, GPU 342 operates with relatively high computational efficiency even though consuming low power. Similar to step 911, in step 922, in some embodiments, GPU power setting module 460 determines a power setting value 461 for a particular GPU power setting in the present control cycle by adjusting a present value for that particular GPU power setting by an amount that is proportional to GPU power error 441.

In step 923, power control system 400 implements operation of GPU 342 with the settings for workload pulsing parameters determined in step 922. Examples of workload pulsing parameters include workload pulse duration, framerate limit, and the like. Alternatively or additionally, in some embodiments, power setting values 461 are compared in step 922 to other power setting values 451 before being implemented. In such embodiments, GPU power setting selector 470 determines which of power setting values 451 or power setting values 461 are implemented in GPU 342, as shown in FIG. 4. Alternatively, in such embodiments, GPU power setting selector 470 selects a lowest value for each type of power setting from power setting values 451 and power setting values 461.

Step 924 is performed when GPU power setting module 460 determines that GPU 342 is operating in a low-power regime with a workload that is not frame-based. In step 924, GPU power setting module 460 determines a GPU active core count, where the active core count is a number of cores 342A that are actively employed by GPU 342. By reducing the active core count of GPU 342, the number of cores 342A that can operate and therefore consume power is reduced. As a result, the power consumed by GPU 342 is also reduced. For example, in some embodiments, the active core count indicates a first set of active cores that can be employed by GPU 342 during operation and a second set of inactive cores that cannot be employed by GPU 342 during operation. Similar to step 911, in step 924, in some embodiments, GPU power setting module 460 determines a power setting value 461 for a particular GPU power setting in the present control cycle by adjusting a present value for that particular GPU power setting by an amount that is proportional to GPU power error 441.

In step 925, power control system 400 implements operation of GPU 342 with the GPU active core count determined in step 924. Thus, in instances in which GPU 342 operates in a low-power regime, power control system 400 can adjust GPU power consumption, and therefore total processor power, by changing the number of active GPU cores. Alternatively or additionally, in some embodiments, power setting values 451 are compared in step 522 to other power setting values 461 before being implemented. In such embodiments, GPU power setting selector 470 determines which of power setting values 451 or power setting values 461 are implemented in GPU 342.

Controlling Battery Drain Rate and Compute Performance

In some embodiments, joint processor power controller 402 of FIG. 4 enables a multi-processor computing device, such as laptop computer 200, to operate with high compute performance while complying with a target performance or battery drain rate, such as target processor power or target battery drain rate 487. Specifically, joint processor power controller 402 determines power setting values 461 for GPU 342 that adjust power consumption of GPU 342 to partially or completely compensate for GPU power error 441. In such embodiments, implementation of power setting values 461 reduces GPU power error 441 by causing power consumption of GPU 342 to increase or decrease as appropriate. Thus, in some embodiments, joint processor power controller 402 enables a trade-off between the computing performance of GPU 342 and battery drain rate of laptop computer 200. One such embodiment is described below in conjunction with FIG. 10.

Figure 10:
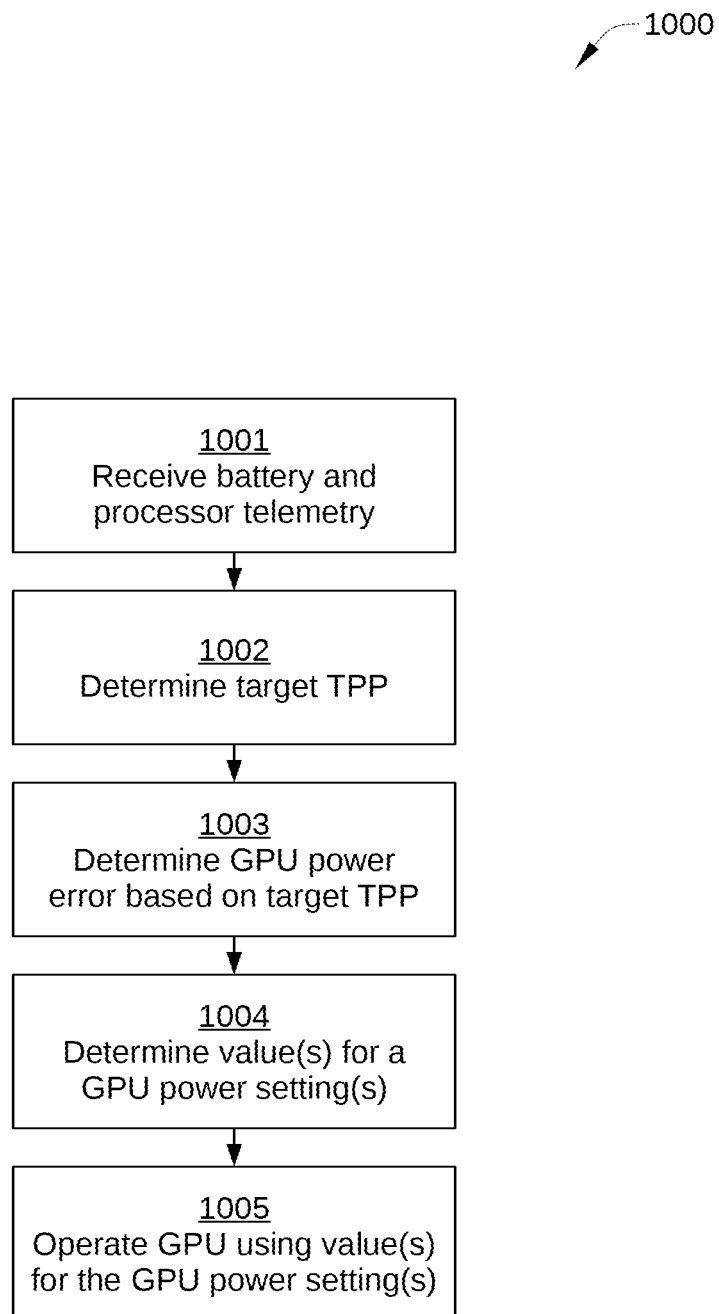
FIG. 10 sets forth a flowchart of method steps for controlling power consumption within a multi-processor computing device, according to yet other various embodiments.

FIG. 10 sets forth a flowchart of method steps for controlling power consumption within a multi-processor computing device, according to various embodiments. Although the method steps are described with respect to the systems of FIGS. 1-4 and 7-8C, any system configured to implement the method steps, in any order, falls within the scope of the various embodiments. Further, although the method steps are illustrated in a particular order, the method steps may be performed in parallel, and/or in a different order than those described herein. Also, the various method steps may be combined into fewer blocks, divided into additional blocks, and/or eliminated based upon a particular implementation.

As shown, a method 1000 begins at step 1001, where joint processor power controller 402 receives telemetry information 482, such as battery and/or processor information. Processor information can include GPU temperature and CPU temperature and/or the present values of power setting values 461.

In step 1002, joint processor power controller 402 determines target TPP 421 for laptop computer 200, for example via front end 420. As noted previously, target TPP 421 may be based on various factors, such as system power that is utilized by the electronic components 340 of laptop computer 200, one or more telemetry values included in telemetry information 482, and/or target processor power or target battery drain rate 487.

In step 1003, joint processor power controller 402 determines GPU power error 441 for the present control cycle. Generally, joint processor power controller 402 determines GPU power error 441 based on target TPP 421, for example via error module 440.

In step 1004, joint processor power controller 402 determines values for one or more power settings for GPU 342, for example via GPU power setting module 460. In some embodiments, method 900 of FIG. 9 is employed to generate the one or more power settings for GPU 342, such as power setting values 461.

In step 1005, laptop computer 200 performs computational work, such as computational tasks 406 from push buffer 405 or other computational operations. In step 1005, power control system 400 ensures that such computational operations are performed while GPU 342 is operated using power setting values 461.

It is noted that in method 1000, joint processor power controller 402 does not set an explicit target power level for GPU 342. Instead, joint processor power controller 402 selects from multiple different power setting values 461 (e.g., GPU core frequency, frame rate, and/or active core count) to operate GPU 342 as efficiently as possible in both high-power and low-power regimes, and for different workload types.

While the above embodiments are described in terms of a laptop computer, the embodiments can also be implemented in other types of multi-processor computing devices, such as desktop computers, electronic tablets, smartphones, and the like. Thus, the power level values determined for CPU 341 and GPU 342 and the criteria on which such power level values are determined are examples only. In other multi-processor computing systems, other power level values and/or other determination criteria for such power level values may be employed according to the embodiments described herein.

In sum, a multi-processor computing device includes a power control system that has two independent power controllers: a joint processor acoustic controller and a joint processor power controller. These two power controllers operate concurrently and independently to reduce the power consumed by the CPU and GPU to a minimum necessary level that sustains a joint processor performance target for the multi-processor computing device. The joint processor performance target is dynamically adjusted so that the CPU and GPU operate in compliance with a target sound level (i.e., a fan noise level) for the multi-processor computing device and a target power or current level for the multi-processor computing device.

At least one technical advantage of the disclosed techniques relative to the prior art is that, with the disclosed techniques, trade-offs between compute performance and acoustics or battery drain rate can be efficiently managed in multi-processor computing devices. More specifically, with the disclosed techniques, processor power that is initially allocated to one processor in a computing device and is unused or inefficiently used can be automatically reallocated to another processor in the computing device. Accordingly, with the disclosed techniques, total available processor power can be utilized more efficiently, thereby increasing the overall performance of the computing device, relative to what can be achieved using prior art approaches. A further advantage is that the total available processor power can be allocated efficiently across the different processors in a given computing device even as total available processor power changes dynamically during operation due to varying ambient conditions, compute loads, and/or user preferences. These technical advantages represent one or more technological improvements over prior art approaches.

1. In some embodiments, a computer-implemented method of controlling power consumption in a multi-processor computing device comprises: determining a first value for a first power setting associated with a first processor based on a sound level generated by the multi-processor computing device; determining a second value for the first power setting based on a power consumption level of the multi-processor computing device; comparing the first value to the second value; and causing the first processor to perform one or more operations based on the lesser of the first value and the second value.

2. The computer-implemented method of clause 1, wherein the first power setting comprises one of a frequency cap for the first processor during operation, a frame-rate limit for the first processor during operation, or a frame-rate limit for the second processor during operation.

3. The computer-implemented method of clauses 1 or 2, further comprising determining a first set of active cores associated with the first processor and a second set of inactive cores associated with the first processor.

4. The computer-implemented method of any of clauses 1-3, wherein causing the first processor to perform one or more operations comprises causing the first processor to perform the one or more operations using the first set of active cores but not the second set of inactive cores.

5. The computer-implemented method of any of clauses 1-4, further comprising determining that a total processor power associated with the multi-processor computing device is less than a threshold value.

6. The computer-implemented method of any of clauses 1-5, wherein the power consumption level of the multi-processor computing device comprises a sum of a first power level consumed by the first processor and a second power level consumed by the second processor.

7. The computer-implemented method of any of clauses 1-6, wherein determining the first value for the first power setting comprises determining whether a current sound level generated by a first fan associated with the first processor and a second fan associated with the second processor exceeds a target sound level.

8. The computer-implemented method of any of clauses 1-7, wherein the target sound level is based on one or more candidate fan speed combinations determined for the first fan and the second fan.

9. The computer-implemented method of any of clauses 1-8, wherein determining the first value for the first power setting comprises: determining one or more candidate fan speed combinations for the first fan and the second fan; and computing a temperature error for a temperature-controlled device included in the multi-processor computing device based on the one or more candidate fan speed combinations and a measured temperature value associated with the temperature-controlled device.

10. The computer-implemented method of any of clauses 1-9, wherein determining the value for the first power setting is based on a temperature error associated with one of the first processor, a second processor of the multi-processor computing device, or a temperature-controlled device included in the multi-processor computing device.

11. In some embodiments, a non-transitory computer readable medium stores instructions that, when executed by a processor, cause the processor to perform the steps of: determining a first value for a first power setting associated with a first processor of a multi-processor computing device based on a sound level generated by the multi-processor computing device; determining a second value for the first power setting based on a power consumption level of the multi-processor computing device; comparing the first value to the second value; and causing the first processor to perform one or more operations based on the lesser of the first value and the second value.

12. The non-transitory computer readable medium of clause 11, wherein the first power setting comprises one of a frequency cap for the first processor during operation or a frame-rate limit for the first processor during operation.

13. The non-transitory computer readable medium of clauses 11 or 12, wherein the steps further comprise determining a first set of active cores associated with the first processor and a second set of inactive cores associated with the first processor.

14. The non-transitory computer readable medium of any of clauses 11-13, wherein causing the first processor to perform one or more operations comprises causing the first processor to perform the one or more operations using the first set of active cores but not the second set of inactive cores.

15. The non-transitory computer readable medium of any of clauses 11-14, wherein the steps further comprise determining that a total processor power associated with the multi-processor computing device is less than a threshold value.

16. The non-transitory computer readable medium of any of clauses 11-15, wherein the power consumption level of the multi-processor computing device comprises a sum of a first power level consumed by the first processor and a second power level consumed by the second processor.

17. The non-transitory computer readable medium of any of clauses 11-16, wherein determining the first value for the first power setting comprises determining whether a current sound level generated by a first fan associated with the first processor and a second fan associated with the second processor exceeds a target sound level.

18. The non-transitory computer readable medium of any of clauses 11-17, wherein determining the first value for the first power setting comprises: determining one or more candidate fan speed combinations for the first fan and the second fan; and computing a temperature error for a temperature-controlled device included in the multi-processor computing device based on the one or more candidate fan speed combinations and a measured temperature value associated with the temperature-controlled device.

19. The non-transitory computer readable medium of any of clauses 11-18, wherein the steps further comprise determining a first value for a second power setting associated with a second processor based on an error rate associated with a plurality of computational tasks provisioned by the second processor and a plurality of computational tasks completed by the first processor.

20. In some embodiments, a system comprises: a memory that stores instructions; and a processor that is communicatively coupled to the memory and is configured to, when executing the instructions, perform the steps of: determining a first value for a first power setting associated with a first processor of a multi-processor computing device based on a sound level generated by the multi-processor computing device; determining a second value for the first power setting based on a power consumption level of the multi-processor computing device; comparing the first value to the second value; and causing the first processor to perform one or more operations based on the lesser of the first value and the second value.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in at least one computer readable medium having computer readable program code embodied thereon.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method of controlling power consumption in a multi-processor computing device, the method comprising:

determining a first value for a first power setting associated with a first processor based on a target sound level for the multi-processor computing device;

determining a second value for the first power setting associated with the first processor based on a target power consumption level of the multi-processor computing device;

comparing the first value for the first power setting to the second value for the first power setting to determine a restrictive value for the first power setting comprising a lesser value of the first value and the second value; and causing the first processor to perform one or more operations based on the restrictive value for the first power setting.

2. The computer-implemented method of claim 1, wherein the first power setting comprises one of a frequency cap for the first processor during operation, or a frame-rate limit for the first processor during operation.

3. The computer-implemented method of claim 1, further comprising determining a first set of active cores associated with the first processor and a second set of inactive cores associated with the first processor.

4. The computer-implemented method of claim 3, wherein causing the first processor to perform one or more operations comprises causing the first processor to perform the one or more operations using the first set of active cores but not the second set of inactive cores.

5. The computer-implemented method of claim 1, further comprising determining that a total processor power associated with the multi-processor computing device is less than a threshold value.

6. The computer-implemented method of claim 1, wherein the target power consumption level of the multi-processor computing device comprises a sum of a first power level consumed by the first processor and a second power level consumed by a second processor of the multi-processor computing device.

7. The computer-implemented method of claim 1, wherein determining the first value for the first power setting comprises determining whether a current sound level generated by a first fan associated with the first processor and a second fan associated with a second processor of the multi-processor computing device exceeds the target sound level.

8. The computer-implemented method of claim 7, wherein the target sound level is based on one or more candidate fan speed combinations determined for the first fan and the second fan.

9. The computer-implemented method of claim 7, wherein determining the first value for the first power setting comprises:

determining one or more candidate fan speed combinations for the first fan and the second fan; and computing a temperature error for a temperature-controlled device included in the multi-processor computing device based on the one or more candidate fan speed combinations and a measured temperature value associated with the temperature-controlled device.

10. The computer-implemented method of claim 1, wherein determining the first value for the first power setting is based on a temperature error associated with one of the first processor, a second processor of the multi-processor computing device, or a temperature-controlled device included in the multi-processor computing device.

11. The computer-implemented method of claim 1, wherein the restrictive value for the first power setting causes the first processor to execute at a highest performance level that complies with the target sound level and the target power consumption level.

12. A non-transitory computer readable medium storing instructions that, when executed by a processor, cause the processor to perform the steps of:
   determining a first value for a first power setting associated with a first processor of a multi-processor computing device based on a target sound level for the multi-processor computing device;
   determining a second value for the first power setting associated with the first processor based on a target power consumption level of the multi- processor computing device;
   comparing the first value for the first power setting to the second value for the first power setting to determine a restrictive value for the first power setting comprising a lesser value of the first value and the second value; and
   causing the first processor to perform one or more operations based on the restrictive value for the first power setting.

13. The non-transitory computer readable medium of claim 12, wherein the first power setting comprises one of a frequency cap for the first processor during operation or a frame-rate limit for the first processor during operation.

14. The non-transitory computer readable medium of claim 12, wherein the steps further comprise determining a first set of active cores associated with the first processor and a second set of inactive cores associated with the first processor.

15. The non-transitory computer readable medium of claim 14, wherein causing the first processor to perform one or more operations comprises causing the first processor to perform the one or more operations using the first set of active cores but not the second set of inactive cores.

16. The non-transitory computer readable medium of claim 14, wherein the steps further comprise determining that a total processor power associated with the multi-processor computing device is less than a threshold value.

17. The non-transitory computer readable medium of claim 12, wherein the target power consumption level of the multi-processor computing device comprises a sum of a first power level consumed by the first processor and a second power level consumed by a second processor of the multi-processor computing device.

18. The non-transitory computer readable medium of claim 12, wherein determining the first value for the first power setting comprises determining whether a current sound level generated by a first fan associated with the first processor and a second fan associated with a second processor of the multi-processor computing device exceeds the target sound level.

19. The non-transitory computer readable medium of claim 18, wherein determining the first value for the first power setting comprises:
   determining one or more candidate fan speed combinations for the first fan and the second fan; and
   computing a temperature error for a temperature-controlled device included in the multi-processor computing device based on the one or more candidate fan speed combinations and a measured temperature value associated with the temperature-controlled device.

20. The non-transitory computer readable medium of claim 12, wherein the steps further comprise determining a first value for a second power setting associated with a second processor based on an error rate associated with a plurality of computational tasks provisioned by the second processor and a plurality of computational tasks completed by the first processor.

21. A system, comprising:
   a memory that stores instructions; and
   a processor that is communicatively coupled to the memory and is configured to, when executing the instructions, perform the steps of:
      determining a first value for a first power setting associated with a first processor of a multi-processor computing device based on a target sound level for the multi-processor computing device;
      determining a second value for the first power setting associated with the first processor based on a target power consumption level of the multi-processor computing device;
      comparing the first value for the first power setting to the second value for the first power setting to determine a restrictive value for the first power setting comprising a lesser value of the first value and the second value; and
      causing the first processor to perform one or more operations based on the restrictive value for the first power setting.

* * * * *